United States Patent
Terada et al.

(10) Patent No.: US 9,937,759 B2
(45) Date of Patent: Apr. 10, 2018

(54) TIRE AIR PRESSURE MONITORING DEVICE, VEHICLE INCLUDING TIRE AIR PRESSURE MONITORING DEVICE, AND TIRE AIR PRESSURE MONITORING METHOD

(71) Applicant: NISSAN MOTOR CO., LTD., Yokohama-shi, Kanagawa (JP)

(72) Inventors: Syoji Terada, Hiratsuka (JP); Masato Hashimoto, Saitama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 235 days.

(21) Appl. No.: 14/886,632

(22) Filed: Oct. 19, 2015

(65) Prior Publication Data

US 2016/0114636 A1 Apr. 28, 2016

(30) Foreign Application Priority Data

Oct. 24, 2014 (JP) .................................. 2014-217489

(51) Int. Cl.
*B60C 23/04* (2006.01)

(52) U.S. Cl.
CPC ...... *B60C 23/0416* (2013.01); *B60C 23/0489* (2013.01)

(58) Field of Classification Search
None
See application file for complete search history.

(56) References Cited

U.S. PATENT DOCUMENTS

| | | | |
|---|---|---|---|
| 6,064,931 A * | 5/2000 | Sawada | B60C 23/061 267/140.14 |
| 6,435,020 B1 * | 8/2002 | Oldenettel | B60C 23/0416 340/445 |
| 2014/0019035 A1 * | 1/2014 | Fink | B60C 23/061 701/300 |

* cited by examiner

*Primary Examiner* — Paul West
*Assistant Examiner* — Mark A Shabman
(74) *Attorney, Agent, or Firm* — Young Basile Hanlon & MacFarlane, P.C.

(57) ABSTRACT

Each time identification information specific to each of wheels is received, a rotation position of each of the wheels is obtained and accumulated as rotation position data of each wheel with respect to each piece of identification information. Then, with respect to all the identification information, when a first tentative mounting position and a second tentative mounting position are the same in a vehicle width direction and different from each other in a vehicle longitudinal direction, the first and second tentative mounting positions being mounting positions of two of the wheels where a smallest degree of dispersion and a second smallest degree of dispersion are detected, and when the first tentative mounting position determined for each piece of the identification information is different from one another, each first tentative mounting position is determined as the mounting position of each of the wheels corresponding to the identification information, respectively.

8 Claims, 12 Drawing Sheets

| SENSOR ID | DISPERSION CHARACTERISTIC VALUE ||
|---|---|---|
| ID:A | XA-FL | 0.87 |
|  | XA-FR | 0.21 |
|  | XA-RL | 0.47 |
|  | XA-RR | 0.25 |
| ID:B | XB-FL | 0.23 |
|  | XB-FR | 0.9 |
|  | XB-RL | 0.18 |
|  | XB-RR | 0.63 |
| ID:C | XC-FL | 0.57 |
|  | XC-FR | 0.29 |
|  | XC-RL | 0.91 |
|  | XC-RR | 0.25 |
| ID:D | XD-FL | 0.28 |
|  | XD-FR | 0.52 |
|  | XD-RL | 0.24 |
|  | XD-RR | 0.89 |

FIG. 12

| SENSOR ID | DISPERSION CHARACTERISTIC VALUE 1 | TARGET WHEEL 1 | DISPERSION CHARACTERISTIC VALUE 2 | TARGET WHEEL 2 | DISPERSION CHARACTERISTIC VALUE 3 | TARGET WHEEL 3 | DISPERSION CHARACTERISTIC VALUE 4 | TARGET WHEEL 4 |
|---|---|---|---|---|---|---|---|---|
| ID:A | XA-FL:0.87 | WFL | XA-RL:0.47 | WRL | XA-RR:0.25 | WRR | XA-FR:0.21 | WFR |
| ID:B | XB-FR:0.9 | WFR | XB-RR:0.63 | WRR | XB-RL:0.23 | WRL | XB-FL:0.18 | WFL |
| ID:C | XC-RL:0.91 | WRL | XC-FL:0.57 | WFL | XC-FR:0.29 | WFR | XC-RR:0.25 | WRR |
| ID:D | XD-RR:0.89 | WRR | XD-FR:0.52 | WFR | XD-FL:0.28 | WFL | XD-RL:0.24 | WRL |

TIRE AIR PRESSURE MONITORING DEVICE, VEHICLE INCLUDING TIRE AIR PRESSURE MONITORING DEVICE, AND TIRE AIR PRESSURE MONITORING METHOD

CROSS REFERENCE TO RELATED APPLICATION

The entire contents of Japanese Patent Application 2014-217489 (filed on Oct. 24, 2014), on which this application claims priority, are incorporated herein by reference.

TECHNICAL FIELD

The present invention relates to a tire air pressure monitoring device for monitoring an air pressure of each of tires, a vehicle including the tire air pressure monitoring device, and a tire air pressure monitoring method.

BACKGROUND

As a technique for monitoring by associating a tire air pressure with a wheel position, for example, as disclosed in U.S. Pat. No. 6,435,020 B1, there is a technique for associating wheel positions identified using differences in rotation speed between each of wheels with positions of the wheels each provided with an air pressure sensor that detects a tire air pressure.

However, the technique disclosed in U.S. Pat. No. 6,435,020 B1 has a problem in that, in a case in which the vehicle runs in a four-wheel drive mode, and the like, a rotation speed difference between the front and rear wheels is small so that identifying the front and rear wheel positions is difficult.

SUMMARY

The present invention has been made in view of the problem as described above, and it is an object of the present invention to provide a technique that enables an improvement in accuracy of identifying a position of each wheel even when a rotation speed difference between the front and rear wheels is small.

To solve the above problem, according to one embodiment of the present invention, in a vehicle capable of performing four-wheel drive traveling, a tire air pressure together with identification information specific to a wheel are transmitted when a rotation position of the wheel comes into agreement with a predetermined rotation position, and the detected air pressure and the identification information are received at a vehicle body. Further, processing in which each time at least the identification information out of the air pressure and the identification information that have been transmitted are received, the detected rotation position of each of the wheels is obtained and accumulated as rotation position data of each of the wheels is performed with respect to each piece of the identification information. Then, a first tentative mounting position that is a mounting position of the wheel in which rotation position data having the smallest degree of dispersion from among accumulated rotation position data is detected is determined as a mounting position of the wheel to which each of the identification information corresponds.

Determination of the mounting position of the wheel is made if it is determined that, with respect to all the identification information, the first tentative mounting position and the second tentative mounting position are positions that are the same in the vehicle width direction and different from each other in the vehicle longitudinal direction, and that each first tentative mounting position determined for each piece of identification information is different from one another. Here, the second tentative mounting position is a mounting position of the wheel in which rotation position data having the second smallest degree of dispersion is detected.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 is a diagram illustrative of a relationship between the four dispersion characteristic values detected with respect to each of the sensor IDs and estimated positions of the wheels;

DETAILED DESCRIPTION OF THE EMBODIMENTS

Hereinafter, a first embodiment of the present invention will be described with reference to the drawings.

First Embodiment (Vehicle Configuration)

A configuration of a vehicle C including a tire air pressure monitoring device 1 will be described with reference to FIG. 1.

Figure 1:
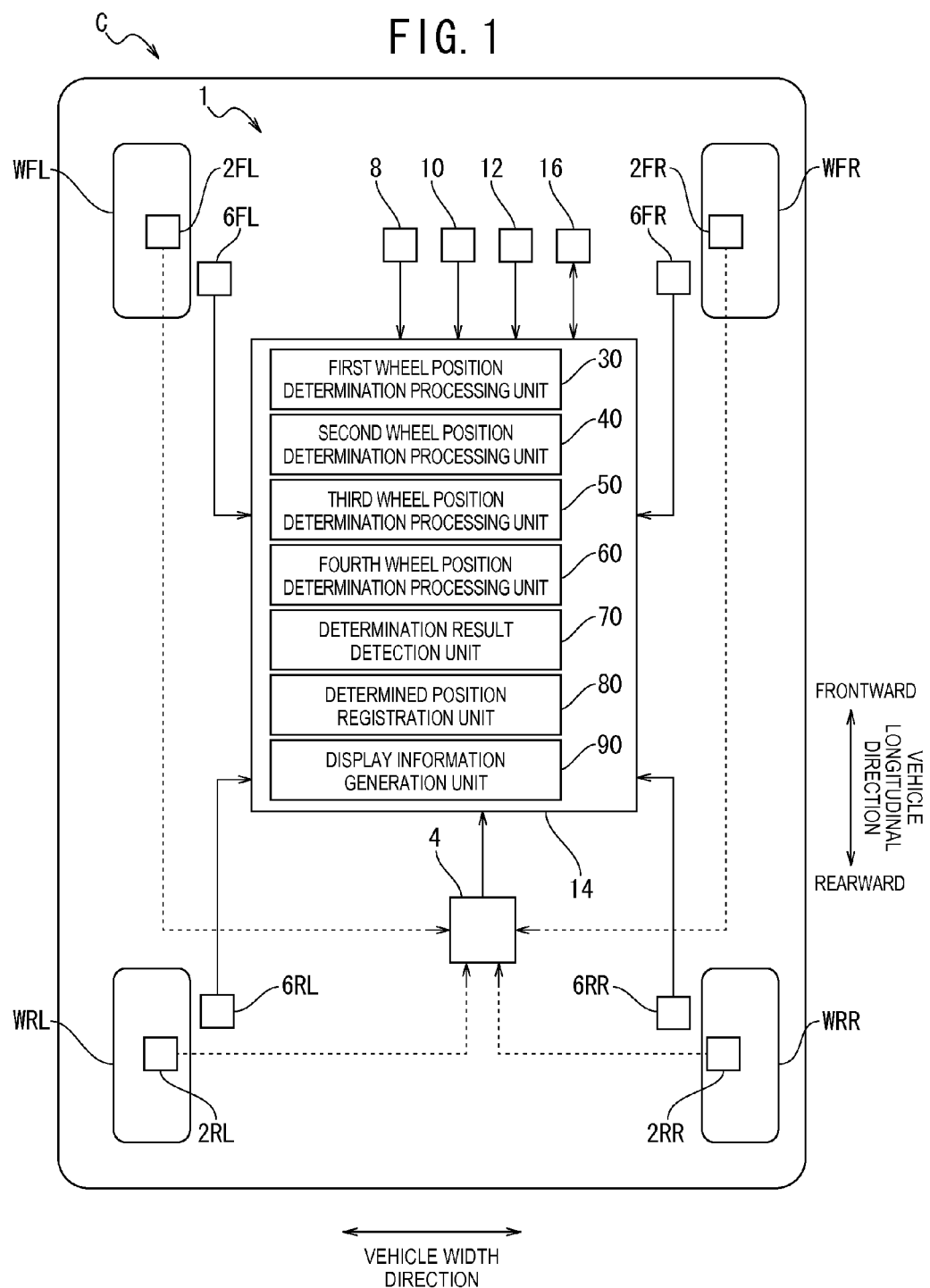
FIG. 1 is a block diagram illustrative of a tire air pressure monitoring device and a vehicle including the tire air pressure monitoring device according to a first embodiment of the present invention.

As illustrated in FIG. 1, the vehicle C includes four wheels W.

The four wheels W are arranged in a vehicle width direction and vehicle longitudinal direction. It is to be noted that, in the drawings and hereinafter, the four wheels W may be referred to as a left front wheel WFL, a right front wheel WFR, a left rear wheel WRL, and a right rear wheel WRR.

The left front wheel WFL and the right front wheel WFR are each formed as a steerable wheel in which a steering angle is varied through a steering operation by a driver (unillustrated).

The left rear wheel WRL and the right rear wheel WRR are arranged further rearward in the vehicle longitudinal direction than the left front wheel WFL and the right front wheel WFR.

(Schematic Configuration of Tire Air Pressure Monitoring Device 1)

A schematic configuration of the tire air pressure monitoring device 1 will be described using FIG. 2 with reference to FIG. 1.

The tire air pressure monitoring device 1 is a device for monitoring an air pressure of a plurality of tires mounted on the plurality of wheels W, respectively, in association with mounting positions of the wheels W, respectively, in a vehicle body.

Moreover, as illustrated in FIG. 1, the tire air pressure monitoring device 1 includes tire pressure monitoring system (TPMS) sensors 2, an information reception unit 4, wheel speed detection units 6, a drive system detection unit 8, and a travel range detection unit 10. In addition, the tire air pressure monitoring device 1 includes a shift position sensor 12, a calculation processing unit 14, and an information display unit 16.

The TPMS sensors 2 are installed on the respective four wheels W. It is to be noted that, in the drawings and hereinafter, the TPMS sensor 2 installed on the left front wheel WFL may be referred to as TPMS sensor 2FL, and the TPMS sensor 2 installed on the right front wheel WFR may be referred to as TPMS sensor 2FR. Similarly, the TPMS sensor 2 installed on the left rear wheel WRL may be referred to as TPMS sensor 2RL, and the TPMS sensor 2 installed on the right rear wheel WRR may be referred to as TPMS sensor 2RR.

Installation positions of the TPMS sensors 2 on the respective wheels W are located at an air valve (unillustrated) of the respective tires.

Figure 2:
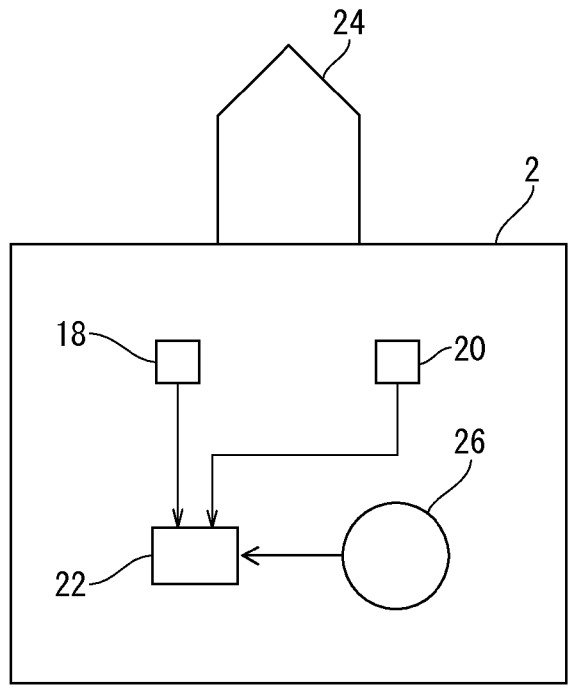
FIG. 2 is a block diagram illustrative of a configuration of a TPMS sensor.

Moreover, each of the TPMS sensors 2 includes, as illustrated in FIG. 2, an air pressure sensor 18, an acceleration sensor 20, a sensor control unit (sensor CU) 22, a transmitter 24, and a battery 26.

The air pressure sensor 18 detects the tire air pressure (Kpa). Further, the air pressure sensor 18 outputs detected air pressure data to the sensor CU 22. Specifically, the air pressure sensors 18 are installed on the respective tires, and each air pressure sensor 18 detects the air pressure of the corresponding tire on which the air pressure sensor 18 is installed.

The acceleration sensor 20 detects the acceleration in a centrifugal direction (centrifugal acceleration) acting on the tire. Further, the acceleration sensor 20 outputs detected centrifugal acceleration data to the sensor CU 22. Moreover, the acceleration sensor 20 outputs, in accordance with the centrifugal acceleration, a trigger signal for data transmission to the sensor CU 22.

The sensor CU 22 outputs to the transmitter 24, based on the trigger signal outputted from the acceleration sensor 20, the TPMS data including air pressure data inputted from the air pressure sensor 18 and an identification (ID) specific to the corresponding TPMS sensor 2, which may be hereinafter referred to as "sensor ID."

In the first embodiment, as an example, a case in which the acceleration sensor 20 outputs a trigger signal when the TPMS sensor 2 is at a predetermined rotation position, which may be hereinafter referred to as "rotation position for calculation," will be described. Meanwhile, in the first embodiment, as an example, a case in which a sensor ID of the TPMS sensor 2FL is set as "ID: A" and a sensor ID of the TPMS sensor 2FR is set as "ID: B" will be described. Similarly, in the first embodiment, as an example, a case in which a sensor ID of the TPMS sensor 2RL is set as "ID: C" and a sensor ID of the TPMS sensor 2RR is set as "ID: D" will be described.

It is to be noted that, in the first embodiment, as an example, a case in which the rotation position for calculation is set uppermost (the highest point) will be described.

The transmitter 24 includes a coil antenna and the like, and outputs a wireless signal containing the TPMS data inputted from the sensor CU 22. Specifically, the transmitters 24 are installed on the respective wheels W, and each transmitter 24 transmits the air pressure detected by the corresponding air pressure sensor 18 together with identification information specific to the wheel W on which the tire is mounted, when a rotation position of the wheel W on which the tire is mounted comes into agreement with a predetermined rotation position for calculation.

The battery 26 is formed as a power source of the TPMS sensor 2 and supplies a power to the sensor CU 22 and the like.

The information reception unit 4 receives a wireless signal containing the TPMS data from each of the TPMS sensor 2FL, the TPMS sensor 2FR, the TPMS sensor 2RL, and the TPMS sensor 2RR. Then, the information reception unit 4 outputs to the calculation processing unit 14 an information signal obtained by decoding each received TPMS data, which may be hereinafter referred to as "TPMS decoded signal." Specifically, the information reception unit 4 is placed on the vehicle body and receives the air pressures detected by the air pressure sensors 18 and the identification information specific to the respective wheels W.

In other words, in the tire air pressure monitoring device 1 according to the first embodiment, the single information reception unit 4 receives the TPMS data transmitted from the four TPMS sensors 2.

The wheel speed detection units 6 detect rotation speeds of the wheels W, and output to the calculation processing unit 14 information signals containing the detected rotation speeds, which may be hereinafter referred to as "wheel speed signals."

It is to be noted that, in FIG. 1, the wheel speed detection unit 6 that detects a rotation speed of the left front wheel WFL is referred to as wheel speed detection unit 6FL, and the wheel speed detection unit 6 that detects a rotation speed of the right front wheel WFR is referred to as wheel speed detection unit 6FR. Similarly, in FIG. 1, the wheel speed detection unit 6 that detects a rotation speed of the left rear wheel WRL is referred to as wheel speed detection unit 6RL, and the wheel speed detection unit 6 that detects a rotation speed of the right rear wheel WRR is referred to as wheel speed detection unit 6RR. Specifically, each wheel speed detection unit 6 is placed on the vehicle body in association with the mounting position of each of the wheels W and detects the rotation position of each of the wheels W at the mounting position thereof.

Moreover, each of the wheel speed detection units 6 is formed as a pulse generator.

The pulse generator includes a rotor (unillustrated), a permanent magnet (unillustrated), and a coil (unillustrated), and generates a predetermined number Z (for example, Z=48) of wheel speed pulses per one rotation of the wheel W.

The rotor is formed into a gear shape having a plurality of teeth, and rotates in synchronization with the wheel W.

The permanent magnet is placed on the vehicle body to face an outer periphery of the rotor.

The coil is placed, in a manner similar to the permanent magnet, on the vehicle body to face the outer periphery of the rotor.

Here, processing in which the wheel speed detection unit 6 detects a rotation speed of the wheel W and outputs a wheel speed signal to the calculation processing unit 14 will be described.

When the rotor rotates, a corrugated surface of the rotor traverses a magnetic field formed around the wheel speed detection unit 6. Consequently, a magnetic flux density in the magnetic field varies so that an electromotive force is generated in the coil. Then, the wheel speed detection unit 6 outputs a voltage variation due to generation of the electromotive force as a wheel speed pulse signal to the calculation processing unit 14. Accordingly, each wheel speed detection unit 6 detects the rotation position of the corresponding wheel W.

The drive system detection unit 8 detects a drive system of the vehicle C. Then, the drive system detection unit 8 outputs to the calculation processing unit 14 an information signal containing the detected drive system, which may be hereinafter referred to as "drive system signal."

In the first embodiment, as an example, a case in which the drive system detection unit 8 detects a drive system selected through an operation of a lever, button, or the like by a driver will be described. Meanwhile, in the first embodiment, as an example, a case in which the selectable drive system of the vehicle C is set as a two-wheel drive (2WD) mode and a four-wheel drive (4WD) mode will be described.

In the 2WD mode, the left front wheel WFL and the right front wheel WFR are rotated by a drive force generated by a drive source (unillustrated), such as an engine or a motor, to be formed as drive wheels for allowing the vehicle C to run.

In the 4WD mode, all the wheels W (left front wheel WFL, right front wheel WFR, left rear wheel WFL, and right rear wheel WRR) are formed as drive wheels.

Meanwhile, in the first embodiment, as an example, a case in which the 4WD mode is a drive system (direct-connection four-wheel drive mode) in which rotation speeds of the front wheels (left front wheel WFL and right front wheel WFR) and rotation speeds of the rear wheels (left rear wheel WRL and right rear wheel WRR) are constantly equal will be described.

The travel range detection unit 10 detects a travel range selected through an operation of a lever, button, or the like by a driver. Then, the travel range detection unit 10 outputs to the calculation processing unit 14 an information signal containing the detected travel range, which may be hereinafter referred to as "travel range signal."

In the first embodiment, as an example, a case in which the selectable travel range of the vehicle C is set as a low (L) range in which traveling at high torque is performed and a high (H) range in which traveling at torque lower than that in the L range will be described.

The shift position sensor 12 detects a current position of a member for changing a shift position of the vehicle C (for example, "P", "D", "R", etc.), such as a shift knob or a shift lever. Then, an information signal containing the detected current position, which may be hereinafter referred to as "shift position signal," is output to the calculation processing unit 14.

The calculation processing unit 14 is formed as an existing engine control unit (ECU) on the vehicle.

Moreover, the calculation processing unit 14 receives input of the TPMS decoded signal from the information reception unit 4. In addition, the calculation processing unit 14 receives input of the wheel speed signal from each wheel speed detection unit 6.

It is to be noted that the input of the wheel speed signal is received through an unillustrated in-vehicle local area network (LAN), such as a controller area network (CAN) bus, or the like.

Moreover, the calculation processing unit 14 includes a first wheel position determination processing unit 30, a second wheel position determination processing unit 40, a third wheel position determination processing unit 50, a fourth wheel position determination processing unit 60, a determination result detection unit 70, a determined position registration unit 80, and a display information generation unit 90.

Figure 3:
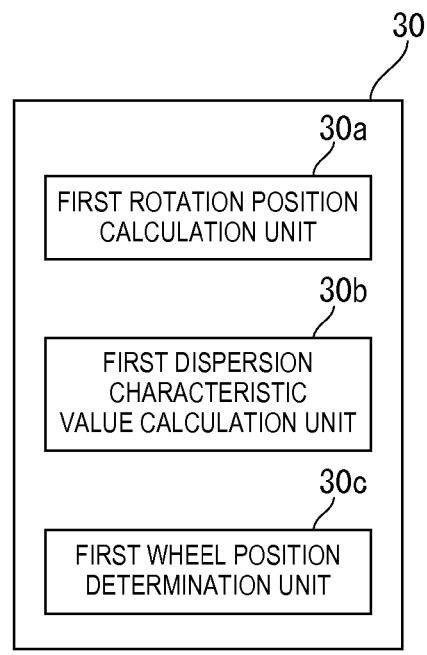
FIG. 3 is a block diagram illustrative of a configuration of a first wheel position determination processing unit.

The first wheel position determination processing unit 30 includes, as illustrated in FIG. 3, a first rotation position calculation unit 30a, a first dispersion characteristic value calculation unit 30b, and a first wheel position determination unit 30c.

The first rotation position calculation unit 30a calculates rotation positions (teeth number of the rotor) of the wheels W when the rotation position of each of the TPMS sensors 2 is uppermost (in agreement with the highest point) using the corresponding TPMS data contained in the TPMS decoded signal and the rotation speeds of the wheels W that are contained in the wheel speed signals. Further, the first rotation position calculation unit 30a outputs to the first dispersion characteristic value calculation unit 30b an information signal containing the rotation positions of the respective wheels W that have been calculated, which may be hereinafter referred to as "first wheel rotation position signal."

Here, the "teeth number of the rotor" indicates which of the plurality of teeth included in the rotor is counted by each of the wheel speed detection units 6. Meanwhile, the "teeth number of the rotor" is determined by dividing a count value of wheel speed pulses by a count value per one rotation of the wheel W (in the first embodiment, the teeth number included in the rotor per one rotation of each of the wheels W, Z=48).

Figure 4:
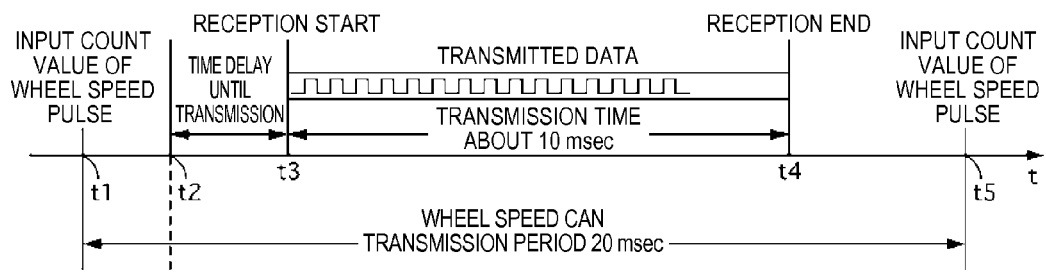
FIG. 4 is a diagram illustrative of a method of calculating a wheel rotation position.

Specifically, as illustrated in FIG. 4, "t1" denotes time when a count value of wheel speed pulses is inputted, and "t2" denotes time when a rotation position of the TPMS sensor 2 comes into agreement with the highest point. In addition, "t3" denotes time when the TPMS sensor 2 actually starts transmitting the TPMS data, "t4" denotes time when reception of the TPMS data by the first rotation position calculation unit 30a is completed, and "t5" denotes time when the count value of the wheel speed pulses is inputted.

The times t1, t4, t5 are actually measured.

The time t3 is calculated by subtracting a data length of the TPMS data from the time t4. It is to be noted that the data length of the TPMS data is a prescribed value and set as, for example, approximately 10 msec.

The time t2 is calculated by subtracting a time delay in transmission from t3. It is to be noted that the time delay in transmission can be calculated in advance by tests and the like.

Accordingly, assume that $z_{t1}$ is the teeth number of the rotor at the time t1, $z_{t2}$ is the teeth number of the rotor at the time t2; and $z_{t5}$ is the teeth number of the rotor at the time t5, the below expression (1) holds true:

$$(t2-t1)/(t5-t1)=(z_{t2}-z_{t1})/(z_{t5}-z_{t1}) \quad (1)$$

Then, the teeth number of the rotor $z_{t2}$ at the time t2 is calculated by changing the expression (1) into the below expression (2), and further calculated according to the below expression (3):

$$z_{t2}-z_{t1}=(z_{t5}-z_{t1})\times(t2-t1)/(t5-t1) \quad (2)$$

$$z_{t2}=z_{t1}+(z_{t5}-z_{t1})\times(t2-t1)/(t5-t1) \quad (3)$$

The first dispersion characteristic value calculation unit 30b generates rotation position data in which the rotation positions of the respective wheels W contained in the first wheel rotation position signal inputted from the first rotation position calculation unit 30a are each accumulated with respect to the each of four sensor IDs. Further, the first dispersion characteristic value calculation unit 30b calculates each of dispersion characteristic values with respect to each of the sensor IDs using degrees of dispersion in the rotation position data that are accumulated with respect to each of the sensor IDs. Then, the first dispersion characteristic value calculation unit 30b outputs to the first wheel position determination unit 30c an information signal containing the dispersion characteristic values calculated with respect to each of the sensor IDs, which may be hereinafter referred to as "first dispersion characteristic value signal."

Figure 5:
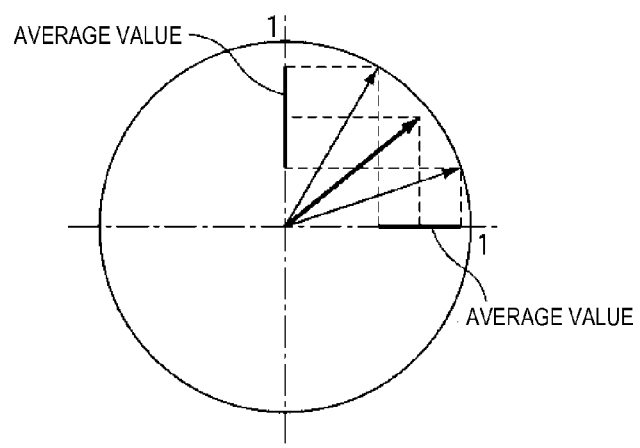
FIG. 5 is a graph illustrative of a method of calculating a dispersion characteristic value.

Specifically, as illustrated in FIG. 5, the rotation position $\theta$ [degrees] (=360×teeth number of the rotor/48) of each wheel W is converted to a coordinate (cos $\theta$, sin $\theta$) on the circumference of a unit circle. It is to be noted that the unit circle has a radius of "1" on the two-dimensional plane where the center of the circle is at the origin (0, 0).

In other words, the rotation position of each wheel W is each set as a vector having a length of "1" that starts at the origin (0, 0) and ends at coordinates (cos $\theta$, sin $\theta$), and an average vector (ave_cos $\theta$, ave_sin $\theta$) of the vectors in the same rotation position data are determined. Then, a scalar quantity of the average vector is calculated as a dispersion characteristic value X of the rotation position data.

Here, the coordinate (cos $\theta$, sin $\theta$) on the circumference of the unit circle is calculated according to the below expression (4):

$$(\cos\theta,\sin\theta)=(\cos((z_{t2}+1)\times2\pi/48),\sin((z_{t2}+1)\times2\pi/48)) \quad (4)$$

Therefore, assume that the number of receptions of TPMS data including the same sensor ID is n, where n is a positive integer, the below expression (5) holds true with respect to the average vector (ave_cos $\theta$, ave_sin $\theta$):

$$(\text{ave\_cos }\theta,\text{ave\_sin }\theta)=((\Sigma(\cos\theta))/n,(\Sigma(\sin\theta))/n) \quad (5)$$

Consequently, the dispersion characteristic value X is calculated according to the below expression (6):

$$X=\text{ave\_cos }\theta^2+\text{ave\_sin }\theta^2 \quad (6)$$

Meanwhile, when the dispersion characteristic value X is calculated with respect to each of the sensor IDs, for example, as illustrated in FIG. 6, relationships between the rotation positions of the respective wheels W (teeth number of the rotor) and the numbers of receptions of the TPMS data is detected. Then, the dispersion characteristic value X is calculated with respect to each of the sensor IDs using this detected relationships.

Here, the relationships between the rotation positions of the respective wheels W and the numbers of receptions of the TPMS data are relationships in a state where the rotation position of the TPMS sensor 2 installed on one wheel W is in agreement with a predetermined rotation position for calculation.

It is to be noted that, in FIGS. 6A to 6D, as an example, the relationships between the rotation positions of the respective wheels W and the numbers of receptions of TPMS data when the rotation position of the TPMS sensor 2FL installed on the left front wheel WFL is in agreement with the highest point (rotation position for calculation) is illustrated.

Figure 6A:
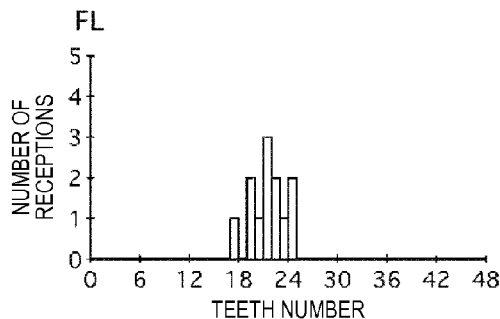
FIGS. 6A to 6D are each a graph illustrative of a relationship between a rotation position of each of wheels and the number of receptions of TPMS data when a rotation position of the TPMS sensor installed on a left front wheel is in agreement with the highest point.
Figure 6B:
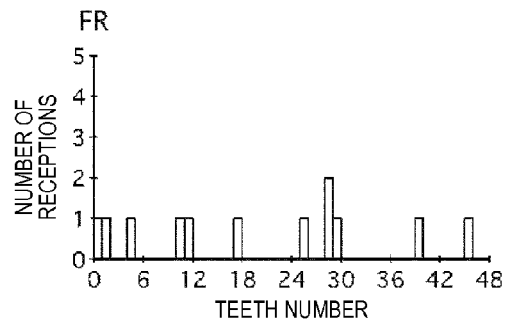
Figure 6C:
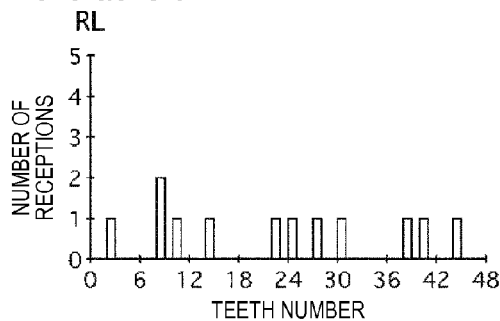
Figure 6D:
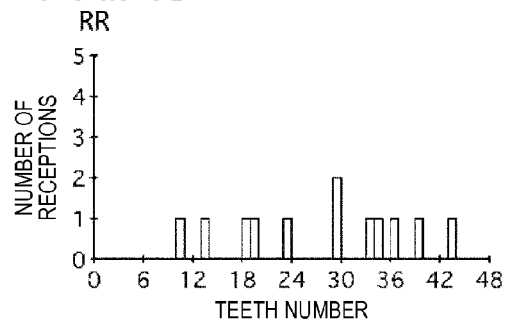

In FIG. 6A, a relationship between the rotation position of the left front wheel WFL and the number of receptions of TPMS data transmitted from the TPMS sensor 2FL is illustrated. In FIG. 6B, a relationship between the rotation position of the right front wheel WFR and the number of receptions of TPMS data transmitted from the TPMS sensor 2FR is illustrated. In FIG. 6C, a relationship between the rotation position of the left rear wheel WRL and the number of receptions of TPMS data transmitted from the TPMS sensor 2RL is illustrated. In FIG. 6D, a relationship between the rotation position of the right rear wheel WRR and the number of receptions of TPMS data transmitted from the TPMS sensor 2RR is illustrated.

As illustrated in FIGS. 6A to 6D, each of degrees of dispersion with respect to the teeth number of the rotor that is detected using the wheel speed detection units 6 other than the wheel speed detection unit 6FL is larger than a degree of dispersion with respect to the teeth number of the rotor that is detected using the wheel speed detection unit 6FL. In other words, the degree of dispersion with respect to the teeth number of the rotor that is detected using the wheel speed detection unit 6FL is the smallest, and a data output period of the TPMS sensor 2FL and a data output period of the wheel speed detection unit 6FL are approximate to each other. This is due to the below reason.

During traveling of the vehicle C, differences in rotation speed among the wheels W are generated due a difference in track between the outer and inner wheels during turning, a lock and a slip of the wheels W, a difference in air pressure of the tires, or the like. It is to be noted that, even during straight traveling, differences in rotation speed between the front wheels and the rear wheels or between the left wheels and the right wheels are generated due to slight steering operation by the driver, differences in state of a road surface on which the left and right wheels pass, or the like. In contrast, the TPMS sensor 2 and the teeth of the rotor included in the wheel speed detection unit 6 that target the same wheel WFL (for example, the TPMS sensor 2FL and the teeth of the rotor included in the wheel speed detection unit 6FL) integrally rotate.

In other words, differences in rotation speed among the wheels W are generated in accordance with traveling, whereas the TPMS sensor 2 and the teeth of the rotor included in the corresponding wheel speed detection unit 6 integrally rotate. Thus, the data output period of the TPMS sensor 2FL and the data output period of the wheel speed detection unit 6FL that target the same wheel WFL constantly synchronize with (correspond to) each other regardless of distance traveled or travel state of the vehicle C.

Figure 7:
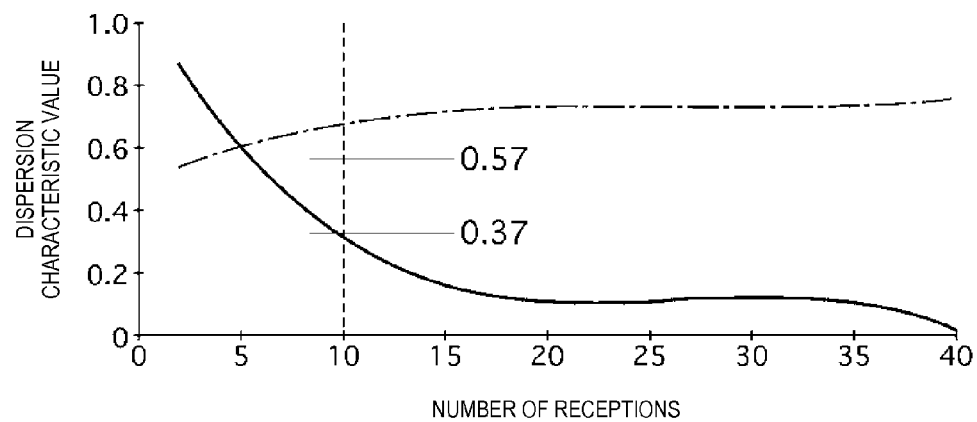
FIG. 7 is a graph illustrative of a change in a dispersion characteristic value in accordance with the number of receptions of the TPMS data.

Moreover, as illustrated in FIG. 7, a dispersion characteristic value Xa calculated from rotation position data of the wheel W on which the corresponding TPMS sensor 2 that has transmitted TPMS data is installed approaches "1.0" as the number of receptions of TPMS data including the same sensor ID increases. On the other hand, a dispersion characteristic value Xb calculated from rotation position data of the wheel W other than the wheel W on which the corresponding TPMS sensor 2 that has transmitted TPMS data is installed approaches "0" as the number of receptions of TPMS data including the same sensor ID increases. Further, as the number of receptions of TPMS data including the same sensor ID, a difference between the dispersion characteristic value Xa and the dispersion characteristic value Xb becomes larger.

It is to be noted that calculation of a dispersion characteristic value that is performed by the first dispersion characteristic value calculation unit 30b is performed when the first rotation position calculation unit 30a has just calculated a rotation position of each of the wheels W with respect to the same sensor ID.

The first wheel position determination unit 30c performs processing of determining, with respect to each of the sensor IDs, a position (position in the vehicle width direction and vehicle longitudinal direction) of each of the wheels W on each of which the corresponding TPMS sensor 2 that has transmitted TPMS data is installed. Then, the first wheel position determination unit 30c outputs to the display information generation unit 90 an information signal containing the position of each of the wheels W that has been determined with respect to each of the sensor IDs, which may be hereinafter referred to as "first wheel position signal."

Specifically, four dispersion characteristic values calculated by the first dispersion characteristic value calculation unit 30b with respect to the same sensor ID are compared with one another. Then, if a dispersion characteristic value of a maximum value (maximum dispersion characteristic value) is above a predetermined first dispersion characteristic threshold value and further the dispersion characteristic values other than the maximum value are below a predetermined second dispersion characteristic threshold value, a wheel position of the rotation position data that corresponds to the maximum dispersion characteristic value is detected.

Subsequently, the detected wheel position is determined as a position of the wheel W on which the TPMS sensor 2 is installed that corresponds to the sensor ID included in the rotation position data used for calculating the maximum dispersion characteristic value. Meanwhile, processing of determining the detected wheel position as a position of the wheel W on which the TPMS sensor 2 is installed that corresponds to the sensor ID included in the rotation position data used for calculating the maximum dispersion characteristic value is performed with respect to all the sensor IDs.

It is to be noted that, in the first embodiment, as an example, a case in which the first dispersion characteristic threshold value is set at "0.57" will be described. Similarly, in the first embodiment, as an example, a case in which the second dispersion characteristic threshold value is set at "0.37" will be described.

As described above, the first wheel position determination processing unit 30 performs first wheel position determination processing in which the positions of the wheels W on which the TPMS sensors 2 that have transmitted TPMS data are installed, respectively, are determined with respect to each of the sensor IDs.

Figure 8:
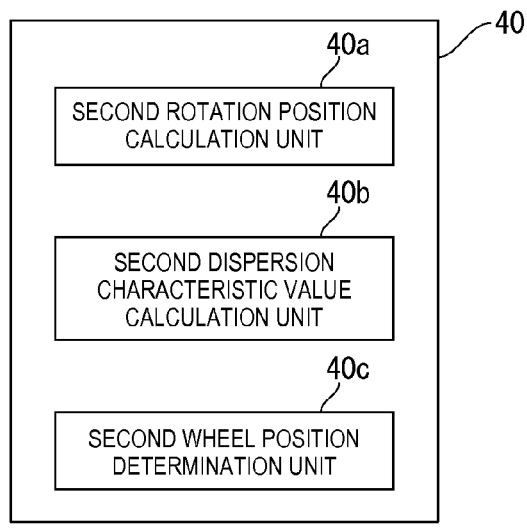
FIG. 8 is a block diagram illustrative of a configuration of a second wheel position determination processing unit.

The second wheel position determination processing unit 40 includes, as illustrated in FIG. 8, a second rotation position calculation unit 40a, a second dispersion characteristic value calculation unit 40b, and a second wheel position determination unit 40c. It is to be noted that a part of a configuration of the second rotation position calculation unit 40a that differs from the first rotation position calculation unit 30a as described above will be hereinafter described. The same applies to the second dispersion characteristic value calculation unit 40b and the second wheel position determination unit 40c.

Moreover, the second wheel position determination processing unit 40, upon receiving input of an instruction signal that starts second wheel position determination processing as described below from the determination result detection unit 70, starts processing in which the positions of the wheels W on which the TPMS sensors 2 that have transmitted TPMS data are installed, respectively, are determined with respect to each of the sensor IDs.

The second rotation position calculation unit 40a receives input of the TPMS data contained in the TPMS decoded signal inputted from the information reception unit 4 and the count values of the wheel speed pulses during a period from a start of a "one trip" to an end thereof. Then, rotation positions (teeth number of the rotor) of the respective wheels W are calculated using the inputted TPMS data and count values when the rotation position of each of the TPMS sensors 2 is each uppermost (in agreement with the highest point).

Subsequently, when receiving input of the count values of the wheel speed pulses of the respective wheels for the first time after the "one trip" starts, the second rotation position calculation unit 40a adds "1" to the remainder with which each of the count values is divided by the teeth number of the rotor per one rotation, thereby calculating a reference teeth number. In addition, at and after the second time after the "one trip" starts, teeth number of the rotor is determined based on a count number of the wheel speed pulses that is calculated using the reference teeth number (a current count value minus the count value of the first time is the count number). Thus, when the "one trip" is started, the reference teeth number is then accordingly updated.

Further, the second rotation position calculation unit 40a outputs to the second dispersion characteristic value calculation unit 40b an information signal containing the rotation positions of the respective wheels W that have been calculated, which may be hereinafter referred to as "second wheel rotation position signal."

It is to be noted that the "one trip" is defined as a period elapsed from receiving an ON signal of a motion flag to receiving an OFF signal of the motion flag. Further, the "ON signal of the motion flag" is an information signal that notifies a start of output of a wireless signal from the transmitter 24 to the calculation processing unit 14. Meanwhile, the "OFF signal of the motion flag" is an information signal that notifies an end of the output of the wireless signal from the transmitter 24 to the calculation processing unit 14.

The second dispersion characteristic value calculation unit 40b generates rotation position data in which the rotation positions of the respective wheels W contained in the second wheel rotation position signal inputted from the second rotation position calculation unit 40a are each accumulated with respect to each of the four sensor IDs. Further, the second dispersion characteristic value calculation unit 40*b* calculates dispersion characteristic values with respect to each of the sensor IDs using degrees of dispersion in the rotation position data that are accumulated with respect to each of the sensor IDs. Then, the second dispersion characteristic value calculation unit 40*b* outputs to the second wheel position determination unit 40*c* an information signal containing the dispersion characteristic values calculated with respect to each of the sensor IDs, which may be hereinafter referred to as "second dispersion characteristic value signal."

Here, calculation of a dispersion characteristic value that is performed by the second dispersion characteristic value calculation unit 40*b* is performed with respect to each "one trip." Further, if predetermined cumulative traveling time elapses during the "one trip," it is defined that the "one trip" ends when the cumulative traveling time elapses. It is to be noted that if the number of receptions of TPMS data is below a predetermined number (three times, for example) during the "one trip," calculation of a dispersion characteristic value by the second dispersion characteristic value calculation unit 40*b* is not performed.

Moreover, if the cumulative traveling time elapses, the second dispersion characteristic value calculation unit 40*b* calculates a final dispersion characteristic value Xend based on the dispersion characteristic values Xtrp1, Xtrp2, . . . , Xtrpm that are calculated with respect to each "one trip." The final dispersion characteristic value Xend is obtained by respectively multiplying Xtrp1, Xtrp2, . . . , Xtrpm by Ktrp1, Ktrp2, . . . , Ktrpm (K1+K2+, . . . , +Km=1) that are weighting coefficients, which are then summated. In other words, the dispersion characteristic value Xend is calculated according to the below expression (7):

$$X\text{end} = K1 \times X\text{trp}1 + K2 \times X\text{trp}2 + Km \times X\text{trpm} \quad (7)$$

Meanwhile, weighting coefficient K1, K2, . . . , Km are respective values (Nm/N) in which the number of receptions of TPMS data in the "one trip," N1, N2, . . . , Nm, are divided by the number of receptions of TPMS data in the cumulative traveling time, N. In other words, the weighting coefficient Km is a ratio of the number of receptions, Nm, to the total number of receptions, N, and becomes greater as the number of receptions, Nm, is greater. It is to be noted that the number of receptions of TPMS data during a trip in which the number of receptions of TPMS data is below three times so that calculation of a dispersion characteristic value is not performed is excluded (subtracted) from the total number of receptions, N.

The second wheel position determination unit 40*c* performs processing of determining, with respect to each of the sensor IDs, a position (position in the vehicle width direction and vehicle longitudinal direction) of each of the wheels W on each of which the TPMS sensor 2 that has transmitted TPMS data is installed. Then, the second wheel position determination unit 40*c* outputs to the display information generation unit 90 an information signal containing the position of each of the wheels W that has been determined with respect to each of the sensor IDs, which may be hereinafter referred to as "second wheel position signal."

Specifically, four dispersion characteristic values calculated by the second dispersion characteristic value calculation unit 40*b* with respect to the same sensor ID are compared with one another. Then, if there is only one maximum dispersion characteristic value, a wheel position of the rotation position data that corresponds to the maximum dispersion characteristic value Xtrpm is detected.

Subsequently, the detected wheel position is determined as a position of the wheel W on which the TPMS sensor 2 is installed that corresponds to the sensor ID included in the rotation position data used for calculating the maximum dispersion characteristic value Xtrpm. Meanwhile, processing of determining the detected wheel position as a position of the wheel W on which the TPMS sensor 2 is installed that corresponds to the sensor ID included in the rotation position data used for calculating the maximum dispersion characteristic value Xtrpm is performed with respect to all the sensor IDs.

As described above, the second wheel position determination processing unit 40 performs the second wheel position determination processing in which the positions of the wheels W on which the TPMS sensors 2 that have transmitted TPMS data are installed are determined with respect to each of the sensor IDs.

Figure 9:
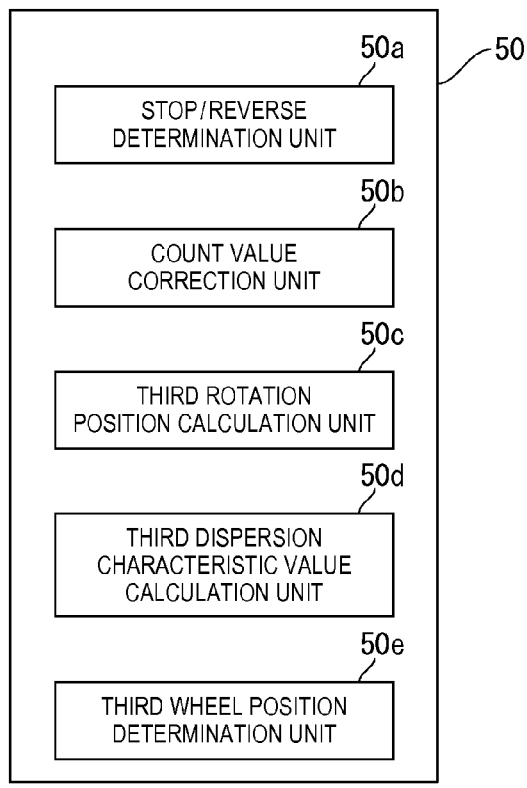
FIG. 9 is a block diagram illustrative of a configuration of a third wheel position determination processing unit.

The third wheel position determination processing unit 50 includes, as illustrated in FIG. 9, a stop/reverse determination unit 50*a*, a count value correction unit 50*b*, a third rotation position calculation unit 50*c*, a third dispersion characteristic value calculation unit 50*d*, and a third wheel position determination unit 50*e*. It is to be noted that a part of a configuration of the third rotation position calculation unit 50*c* that differs from the first rotation position calculation unit 30*a* as described above will be hereinafter described. The same applies to the third dispersion characteristic value calculation unit 50*d* and the third wheel position determination unit 50*e*.

Moreover, the third wheel position determination processing unit 50, upon receiving input of an instruction signal that starts third wheel position determination processing as described below from the determination result detection unit 70, starts processing in which the positions of the wheels W on which the TPMS sensors 2 that have transmitted TPMS data are installed, respectively, are determined with respect to each of the sensor IDs.

The stop/reverse determination unit 50*a* determines that the vehicle C is stopping when a shift position contained in the shift position signal is "P" (parking), or when all the count values of wheel speed pulses are not counted (not increased) for a predetermined determination period or more. Then, an information signal containing a determination result in which the vehicle C is stopping, which may be hereinafter referred to as "stop determination signal," is outputted to the count value correction unit 50*b*.

It is to be noted that, in the first embodiment, as an example, a case in which the determination period is set at 400 [msec] will be described.

Moreover, the stop/reverse determination unit 50*a* determines that the vehicle C is reversing when the shift position contained in the shift position signal is "R" (reverse). Then, an information signal containing a determination result in which the vehicle C is reversing, which may be hereinafter referred to as "reverse determination signal," is outputted to the count value correction unit 50*b*.

When receiving input of the stop determination signal from the stop/reverse determination unit 50*a*, the count value correction unit 50*b* calculates a stop-case corrected count value in which a count number during a period in which the vehicle C is stopping is subtracted from a count value of the wheel speed pulses of each wheel. Then, an information signal containing the stop-case corrected count value, which may be hereinafter referred to as "stop-case corrected count value signal," is outputted to the third rotation position calculation unit 50*c*.

Meanwhile, when receiving input the reverse determination signal from the stop/reverse determination unit 50a, the count value correction unit 50b multiplies twice a count number during a period in which the vehicle C is reversing. Further, a reverse-case corrected count value in which the multiplied number is subtracted from a count value of the wheel speed pulses of each wheel is calculated. Then, an information signal containing the reverse-case corrected count value, which may be hereinafter referred to as "reverse-case corrected count value signal," is outputted to the third rotation position calculation unit 50c.

It is to be noted that when not receiving input of both the stop determination signal and the reverse determination signal from the stop/reverse determination unit 50a, the count value correction unit 50b performs output as they are without correcting count values of wheel speed pulses.

The third rotation position calculation unit 50c performs processing similar to that by the first rotation position calculation unit 30a using count values inputted from the count value correction unit 50b. Then, an information signal containing rotation positions of the respective wheels W that have been calculated, which may be hereinafter referred to as "third wheel rotation position signal," is outputted to the third dispersion characteristic value calculation unit 50d.

The third dispersion characteristic value calculation unit 50d performs processing similar to that by the first dispersion characteristic value calculation unit 30b, and outputs to the third wheel position determination unit 50e an information signal containing dispersion characteristic values calculated with respect to each of the sensor IDs, which may be hereinafter referred to as "third dispersion characteristic value signal."

The third wheel position determination unit 50e performs processing similar to that by the first wheel position determination unit 30c, and outputs to the display information generation unit 90 an information signal containing position of each of the wheels W that has been determined with respect to each of the sensor IDs, which may be hereinafter referred to as "third wheel position signal."

As described above, the third wheel position determination processing unit 50 performs the third wheel position determination processing in which the positions of the wheels W on which the TPMS sensors 2 that have transmitted TPMS data are installed, respectively, are determined with respect to each of the sensor IDs.

Figures 10, 11:
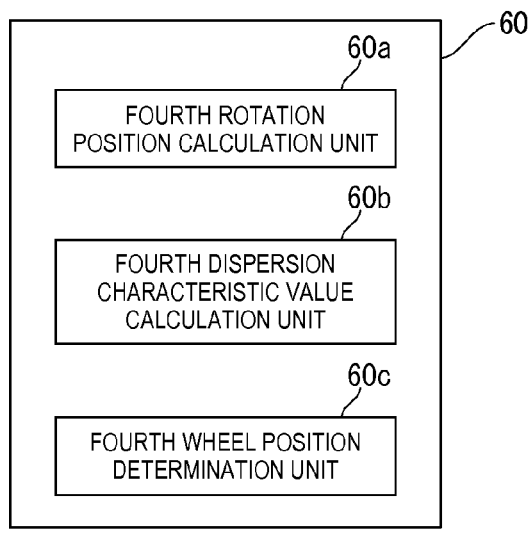
FIG. 10 is a block diagram illustrative of a configuration of a fourth wheel position determination processing unit.
FIG. 11 is a diagram illustrative of four dispersion characteristic values detected with respect to each of sensor IDs.

The fourth wheel position determination processing unit 60 includes, as illustrated in FIG. 10, a fourth rotation position calculation unit 60a, a fourth dispersion characteristic value calculation unit 60b, and a fourth wheel position determination unit 60c. It is to be noted that a part of a configuration of the fourth rotation position calculation unit 60a that differs from the first rotation position calculation unit 30a as described above will be hereinafter described. The same applies to the fourth dispersion characteristic value calculation unit 60b and the fourth wheel position determination unit 60c.

Moreover, the fourth wheel position determination processing unit 60, upon receiving input of an instruction signal that starts fourth wheel position determination processing as described below from the determination result detection unit 70, starts processing in which the positions of the wheels W on which the TPMS sensors 2 that have transmitted TPMS data are installed, respectively, are determined with respect to each of the sensor IDs.

The fourth rotation position calculation unit 60a performs processing similar to that by the first rotation position calculation unit 30a, and outputs to the fourth dispersion characteristic value calculation unit 60b an information signal containing rotation positions of the respective wheels W that have been calculated, which may be hereinafter referred to as "fourth wheel rotation position signal."

The fourth dispersion characteristic value calculation unit 60b performs processing similar to that by the first dispersion characteristic value calculation unit 30b, and outputs to the fourth wheel position determination unit 60c an information signal containing dispersion characteristic values calculated with respect to each of the sensor IDs, which may be hereinafter referred to as "fourth dispersion characteristic value signal."

The fourth wheel position determination unit 60c firstly detects four dispersion characteristic values with respect to each of the sensor IDs.

Here, the four dispersion characteristic values with respect to each of the sensor IDs are values individually calculated using relationships between rotation positions of the respective wheels W and the numbers of receptions of the TPMS data that has been transmitted from each corresponding TPMS sensor 2.

(Dispersion Characteristic Values Calculated Using Relationships with Respect to the Number of Receptions of the TPMS Data that has been Transmitted from the TPMS Sensor 2FL)

Dispersion characteristic values X calculated using relationships with respect to the number of receptions of the TPMS data that has been transmitted from the TPMS sensor 2FL are four dispersion characteristic values XA (dispersion characteristic value XA-FL, dispersion characteristic value XA-FR, dispersion characteristic value XA-RL, dispersion characteristic value XA-RR).

Dispersion Characteristic Value XA-FL

A dispersion characteristic value X calculated using a relationship between a rotation position of the left front wheel WFL and the number of receptions of the TPMS data that has been transmitted from the TPMS sensor 2FL when a rotation position of the TPMS sensor 2FL is in agreement with the highest point.

Dispersion Characteristic Value XA-FR

A dispersion characteristic value X calculated using a relationship between a rotation position of the left front wheel WFL and the number of receptions of the TPMS data that has been transmitted from the TPMS sensor 2FL when a rotation position of the TPMS sensor 2FR is in agreement with the highest point.

Dispersion Characteristic Value XA-RL

A dispersion characteristic value X calculated using a relationship between a rotation position of the left front wheel WFL and the number of receptions of the TPMS data that has been transmitted from the TPMS sensor 2FL when a rotation position of the TPMS sensor 2RL is in agreement with the highest point.

Dispersion Characteristic Value XA-RR

A dispersion characteristic value X calculated using a relationship between a rotation position of the left front wheel WFL and the number of receptions of the TPMS data that has been transmitted from the TPMS sensor 2FL when a rotation position of the TPMS sensor 2RR is in agreement with the highest point.

(Dispersion Characteristic Values Calculated Using Relationships with Respect to the Number of Receptions of the TPMS Data that has been Transmitted from the TPMS Sensor 2FR)

Dispersion characteristic values X calculated using relationships with respect to the number of receptions of the TPMS data that has been transmitted from the TPMS sensor 2FR are four dispersion characteristic values XB (dispersion characteristic value XB-FL, dispersion characteristic value XB-FR, dispersion characteristic value XB-RL, dispersion characteristic value XB-RR).

Dispersion Characteristic Value XB-FL

A dispersion characteristic value X calculated using a relationship between a rotation position of the right front wheel WFR and the number of receptions of the TPMS data that has been transmitted from the TPMS sensor 2FR when a rotation position of the TPMS sensor 2FL is in agreement with the highest point.

Dispersion Characteristic Value XB-FR

A dispersion characteristic value X calculated using a relationship between a rotation position of the right front wheel WFR and the number of receptions of the TPMS data that has been transmitted from the TPMS sensor 2FR when a rotation position of the TPMS sensor 2FR is in agreement with the highest point.

Dispersion Characteristic Value XB-RL

A dispersion characteristic value X calculated using a relationship between a rotation position of the right front wheel WFR and the number of receptions of the TPMS data that has been transmitted from the TPMS sensor 2FR when a rotation position of the TPMS sensor 2RL is in agreement with the highest point.

Dispersion Characteristic Value XB-RR

A dispersion characteristic value X calculated using a relationship between a rotation position of the right front wheel WFR and the number of receptions of the TPMS data that has been transmitted from the TPMS sensor 2FR when a rotation position of the TPMS sensor 2RR is in agreement with the highest point.

(Dispersion Characteristic Values Calculated Using Relationships with Respect to the Number of Receptions of the TPMS Data that has been Transmitted from the TPMS Sensor 2RL)

Dispersion characteristic values X calculated using relationships with respect to the number of receptions of the TPMS data that has been transmitted from the TPMS sensor 2RL are four dispersion characteristic values XC (dispersion characteristic value XC-FL, dispersion characteristic value XC-FR, dispersion characteristic value XC-RL, dispersion characteristic value XC-RR).

Dispersion Characteristic Value XC-FL

A dispersion characteristic value X calculated using a relationship between a rotation position of the left rear wheel WRL and the number of receptions of the TPMS data that has been transmitted from the TPMS sensor 2RL when a rotation position of the TPMS sensor 2FL is in agreement with the highest point.

Dispersion Characteristic Value XC-FR

A dispersion characteristic value X calculated using a relationship between a rotation position of the left rear wheel WRL and the number of receptions of the TPMS data that has been transmitted from the TPMS sensor 2RL when a rotation position of the TPMS sensor 2FR is in agreement with the highest point.

Dispersion Characteristic Value XC-RL

A dispersion characteristic value X calculated using a relationship between a rotation position of the left rear wheel WRL and the number of receptions of the TPMS data that has been transmitted from the TPMS sensor 2RL when a rotation position of the TPMS sensor 2RL is in agreement with the highest point.

Dispersion Characteristic Value XC-RR

A dispersion characteristic value X calculated using a relationship between a rotation position of the left rear wheel WRL and the number of receptions of the TPMS data that has been transmitted from the TPMS sensor 2RL when a rotation position of the TPMS sensor 2RR is in agreement with the highest point.

(Dispersion Characteristic Values Calculated Using Relationships with Respect to the Number of Receptions of the TPMS Data that has been Transmitted from the TPMS Sensor 2RR)

Dispersion characteristic values X calculated using relationships with respect to the number of receptions of the TPMS data that has been transmitted from the TPMS sensor 2RR are four dispersion characteristic values XD (dispersion characteristic value XD-FL, dispersion characteristic value XD-FR, dispersion characteristic value XD-RL, dispersion characteristic value XD-RR).

Dispersion Characteristic Value XD-FL

A dispersion characteristic value X calculated using a relationship between a rotation position of the right rear wheel WRR and the number of receptions of the TPMS data that has been transmitted from the TPMS sensor 2RR when a rotation position of the TPMS sensor 2FL is in agreement with the highest point.

Dispersion Characteristic Value XD-FR

A dispersion characteristic value X calculated using a relationship between a rotation position of the right rear wheel WRR and the number of receptions of the TPMS data that has been transmitted from the TPMS sensor 2RR when a rotation position of the TPMS sensor 2FR is in agreement with the highest point.

Dispersion Characteristic Value XD-RL

A dispersion characteristic value X calculated using a relationship between a rotation position of the right rear wheel WRR and the number of receptions of the TPMS data that has been transmitted from the TPMS sensor 2RR when a rotation position of the TPMS sensor 2RL is in agreement with the highest point.

Dispersion Characteristic Value XD-RR

A dispersion characteristic value X calculated using a relationship between a rotation position of the right rear wheel WRR and the number of receptions of the TPMS data that has been transmitted from the TPMS sensor 2RR when a rotation position of the TPMS sensor 2RR is in agreement with the highest point.

The four dispersion characteristic values X (XA, XB, XC, XD) detected with respect to each of the sensor IDs are indicated, for example, in FIG. 11.

Next, the four dispersion characteristic values X are arranged (sorted) with respect to each of the sensor IDs in a descending order starting from the largest value, and a dispersion characteristic value X that is maximum (maximum dispersion characteristic value) is determined with respect to each of the sensor IDs using the magnitude of the sorted dispersion characteristic values X. Then, a position of the wheel W, as indicated by the maximum dispersion characteristic value, on which the corresponding TPMS sensor 2 is installed when a rotation position of the corresponding TPMS sensor 2 is in agreement with the highest point is determined as a position of the wheel W having a maximum dispersion characteristic value ID.

Hereinafter, as a specific example, processing in which a position the wheel W on which the TPMS sensor 2FL is installed is determined will be described.

The processing in which a position the wheel W on which the TPMS sensor 2FL is installed is determined includes a first target wheel estimation step, a second target wheel estimation step, a third target wheel estimation step, a fourth target wheel estimation step, and a wheel position decision step.

First Target Wheel Estimation Step

Since the TPMS sensor 2FL outputs TPMS data including the sensor ID of "ID: A," in the first target wheel estimation step, first, as illustrated in FIG. 12, four dispersion characteristic values XA are sorted in a descending order starting from the largest value. Further, to which value of the four dispersion characteristic values XA a maximum dispersion characteristic value, which is referred to as "dispersion characteristic value 1" in FIG. 12, corresponds is detected.

Then, as illustrated in FIG. 12, if the dispersion characteristic value 1 corresponds to the dispersion characteristic value XA-FL, it is estimated that the TPMS data used for calculating the dispersion characteristic value 1 has been transmitted when a rotation position of the TPMS sensor 2FL is in agreement with the highest point. Thereby, the wheel W on which the corresponding TPMS sensor 2 is installed that has transmitted the TPMS data used for calculating the dispersion characteristic value 1 is estimated as the left front wheel WFL, which is referred to as "target wheel 1" in FIG. 12.

In the first embodiment, as an example of processing performed in the first target wheel estimation step, from among the four dispersion characteristic values XA, two rotation position data that exceed a predetermined upper dispersion characteristic threshold value are detected. In addition, a case in which larger data from between the two rotation position data that exceed the predetermined upper dispersion characteristic threshold value is set as the maximum dispersion characteristic value that is rotation position data having the smallest degree of dispersion will be described.

Moreover, in the first embodiment, as an example, a case in which the upper dispersion characteristic threshold value is set at "0.57" will be described.

Second Target Wheel Estimation Step

The second target wheel estimation step is processing performed following the first target wheel estimation step.

In the second target wheel estimation step, first, from among the four dispersion characteristic values XA, to which value of the four dispersion characteristic values XA a largest value behind the dispersion characteristic value 1, which is referred to as "dispersion characteristic value 2" in FIG. 12, corresponds is detected.

Subsequently, whether or not the dispersion characteristic value 2 is on the same side in the vehicle width direction and on the different side in the vehicle longitudinal direction with respect to the dispersion characteristic value 1 is determined. In other words, whether or not the dispersion characteristic value 2 is the dispersion characteristic value XA-RL that is on the same side in the vehicle width direction and on the different side in the vehicle longitudinal direction with respect to the dispersion characteristic value XA-FL is determined.

Then, as illustrated in FIG. 12, if the dispersion characteristic value 2 corresponds to the dispersion characteristic value XA-RL, it is estimated that the TPMS data used for calculating the dispersion characteristic value 2 has been transmitted when a rotation position of the TPMS sensor 2RL is in agreement with the highest point. Thereby, the wheel W on which the corresponding TPMS sensor 2 is installed that has transmitted the TPMS data used for calculating the dispersion characteristic value 2 is estimated as the left rear wheel WRL, which is referred to as "target wheel 2" in FIG. 12.

It is to be noted that, as an example of processing performed in the second target wheel estimation step, from among the four dispersion characteristic values XA, two rotation position data that exceed a predetermined upper dispersion characteristic threshold value are detected. In addition, processing in which smaller data from between the two rotation position data that exceed the predetermined upper dispersion characteristic threshold value is set as the dispersion characteristic value 2 that is rotation position data having the second smallest degree of dispersion may be performed.

Third Target Wheel Estimation Step

The third target wheel estimation step is processing performed following the second target wheel estimation step.

In the third target wheel estimation step, first, from among the four dispersion characteristic values XA, to which value of the four dispersion characteristic values XA a largest value behind the dispersion characteristic value 2, which is referred to as "dispersion characteristic value 3" in FIG. 12, corresponds is detected.

Subsequently, whether or not the dispersion characteristic value 3 is on the different side in the vehicle width direction with respect to the dispersion characteristic value 1 and the dispersion characteristic value 2 is determined.

Then, as illustrated in FIG. 12, if the dispersion characteristic value 3 corresponds to the dispersion characteristic value XA-RR, it is estimated that the TPMS data used for calculating the dispersion characteristic value 3 has been transmitted when a rotation position of the TPMS sensor 2RR is in agreement with the highest point. Thereby, the wheel W on which the corresponding TPMS sensor 2 is installed that has transmitted the TPMS data used for calculating the dispersion characteristic value 3 is estimated as the right rear wheel WRR, which is referred to as "target wheel 3" in FIG. 12.

Fourth Target Wheel Estimation Step

The fourth target wheel estimation step is processing performed following the third target wheel estimation step.

In the fourth target wheel estimation step, first, whether or not a minimum value from among the four dispersion characteristic values XA, which is referred to as "dispersion characteristic value 4" in FIG. 12, is on the same side in the vehicle width direction and on the different side in the vehicle longitudinal direction with respect to the dispersion characteristic value 3 is determined. In other words, whether or not the dispersion characteristic value 4 is the dispersion characteristic value XA-FR that is on the same side in the vehicle width direction and on the different side in the vehicle longitudinal direction with respect to the dispersion characteristic value XA-RR is determined.

Then, as illustrated in FIG. 12, if the dispersion characteristic value 4 corresponds to the dispersion characteristic value XA-FR, it is estimated that the TPMS data used for calculating the dispersion characteristic value 4 has been transmitted when a rotation position of the TPMS sensor 2FR is in agreement with the highest point. Thereby, the wheel W on which the corresponding TPMS sensor 2 is installed that has transmitted the TPMS data used for calculating the dispersion characteristic value 4 is estimated as the right front wheel WFR, which is referred to as "target wheel 4" in FIG. 12.

Wheel Position Decision Step

The wheel position decision step is processing performed following the fourth target wheel estimation step.

In the wheel position decision step, first, whether or not the position of the target wheel 1 and the position of the target wheel 2 are in a positional relationship in which these positions are the same in the vehicle width direction and different from each other in the vehicle longitudinal direction is determined. Subsequently, if the position of the target wheel 1 and the position of the target wheel 2 are in a positional relationship in which these positions are the same in the vehicle width direction and different from each other in the vehicle longitudinal direction, whether or not positions of the target wheels 1 to 4 that have been respectively estimated in the first to fourth target wheel estimation steps all fail to overlap with one another, that is, are all different from one another in the vehicle width direction and vehicle longitudinal direction may be determined.

Then, if the positions of the target wheels 1 to 4 are determined to fail to overlap with one another, that is, determined to be all different from one another in the vehicle width direction and vehicle longitudinal direction, the positions of the respective wheels W that have been estimated as the target wheel 1 may be decided. Thereby, the positions of the wheels W on which the TPMS sensors 2 are installed are determined with respect to the respective sensor IDs, and an information signal containing the positions of the wheels W that have been determined with respect to the respective sensor IDs, which may be hereinafter referred to as "fourth wheel position signal," is outputted to the display information generation unit 90.

It is to be noted that, in the example illustrated in FIG. 12, the wheel W on which the TPMS sensor 2FL is installed is decided as the left front wheel WFL. Thereby, a position of the wheel W on which the TPMS sensor 2FL is installed is decided to be left in the vehicle width direction and front in the vehicle longitudinal direction. Similarly, a position of the wheel W on which the TPMS sensor 2FR is installed is decided to be right in the vehicle width direction and front in the vehicle longitudinal direction. Further, a position of the wheel W on which the TPMS sensor 2RL is installed is decided to be left in the vehicle width direction and rear in the vehicle longitudinal direction, and a position of the wheel W on which the TPMS sensor 2RR is installed is decided to be right in the vehicle width direction and rear in the vehicle longitudinal direction.

Here, a background of the processing performed in the wheel position decision step will be described.

The present inventors have performed an evaluation test with respect to the relationship between each of the dispersion characteristic values and a position of the wheels W and have obtained a result in which, if normal processing is performed, the positional relationship between the target wheel 1 and the target wheel 2 is a relationship of positions that are the same in the vehicle width direction and different from each other in the vehicle longitudinal direction. In addition, a result in which, if normal processing is performed, the positions of the target wheels 1 to 4 all fail to overlap with one another, that is, are all different from one another in the vehicle width direction and vehicle longitudinal direction has been obtained.

In other words, a verification result in which there is regularity in that the positional relationship between the target wheel 1 and the target wheel 2 is a relationship of positions that are the same in the vehicle width direction and different from each other in the vehicle longitudinal direction has been obtained. In addition, a verification result in which there is regularity in that the positions of the target wheels 1 to 4 all fail to overlap with one another, and that is, are all different from one another in the vehicle width direction and vehicle longitudinal direction has been obtained.

Thus, in the first embodiment, in the wheel position decision step, if the below conditions (A) and (B) are satisfied, the positions of the respective wheels W that have been estimated as the target wheel 1 may be decided.

Condition (A): the position of the target wheel 1 and the position of the target wheel 2 are in a positional relationship in which these positions are the same in the vehicle width direction and different from each other in the vehicle longitudinal direction.

Condition (B): the positions of the target wheels 1 to 4 all fail to overlap with one another and are all different from one another in the vehicle width direction and vehicle longitudinal direction.

Moreover, in the first embodiment, as an example, a case in which, if a difference between the dispersion characteristic value 1 and the dispersion characteristic value 2 is less than a predetermined dispersion characteristic threshold value for difference determination, processing of determining a tentative mounting position of the target wheel 1 as a mounting position of the wheel to which identification information corresponds is not performed will be described. Moreover, if, with respect to at least one piece of identification information, a difference between the dispersion characteristic value 1 and the dispersion characteristic value 2 is less than a predetermined dispersion characteristic threshold value for difference determination, processing of determining a tentative mounting position of the target wheel 1 as a mounting position of the wheel to which identification information corresponds is not performed with respect to all the identification information.

In other words, in the first embodiment, a difference between rotation position data having the smallest degree of dispersion and rotation position data having the second smallest degree of dispersion is less than a predetermined dispersion characteristic threshold value for difference determination, a position of the target wheel 1 is not determined.

Moreover, in the first embodiment, as an example, a case in which the dispersion characteristic threshold value for difference determination is set at "0.2" will be described. It is to be noted that the dispersion characteristic threshold value for difference determination is not limited to "0.2."

Further, in the first embodiment, as an example, a case in which, if the dispersion characteristic value 3 and the dispersion characteristic value 4 are more than a predetermined lower dispersion characteristic threshold value, processing of determining a tentative mounting position of the target wheel 1 as a mounting position of the wheel to which identification information corresponds is not performed will be described. Moreover, if, with respect to at least one piece of identification information, the dispersion characteristic value 3 and the dispersion characteristic value 4 are more than a predetermined lower dispersion characteristic threshold value, processing of determining a tentative mounting position of the target wheel 1 as a mounting position of the wheel to which identification information corresponds is not performed with respect to all the identification information.

In other words, in the first embodiment, rotation position data having a degree of dispersion larger than rotation position data having the second smallest degree of dispersion is more than or equal to a predetermined lower dispersion characteristic threshold value, a position of the target wheel 1 is not determined.

Moreover, in the first embodiment, as an example, a case in which the lower dispersion characteristic threshold value is set at "0.37" will be described.

The fourth wheel position determination processing unit 60 performs the fourth wheel position determination processing in which the positions of the wheels W on which the TPMS sensors 2 that have transmitted TPMS data are installed, respectively, are determined with respect to each of the sensor IDs.

Thus, the fourth wheel position determination processing unit 60 obtains rotation positions of the wheels W that have been detected by the wheel speed detection units 6 each time the information reception unit 4 receives at least identification information out of air pressures and identification information that have been transmitted from the TPMS sensors 2. Then, processing of accumulating as rotation position data of each of the wheels W is performed with respect to each piece of the identification information. Further, mounting positions of the respective wheels W are determined based on dispersion in the accumulated rotation position data.

Specifically, if the below conditions (I) and (II) are satisfied, with respect to all the identification information, a mounting position of the wheel W to which the wheel speed detection unit 6 that has detected rotation position data having the smallest degree of dispersion corresponds may be determined as a mounting position of the wheel W to which identification information corresponds to.

Condition (I): a first tentative mounting position and a second tentative mounting position are positions that are the same in the vehicle width direction and different from each other in the vehicle longitudinal direction. It is to be noted that the first tentative mounting position is a mounting position of the wheel to which a rotation position detection unit that has detected rotation position data having the smallest degree of dispersion from among accumulated rotation position data corresponds. Meanwhile, the second tentative mounting position is a mounting position of the wheel to which the rotation position detection unit that has detected rotation position data having the second smallest degree of dispersion corresponds.

Condition (II): it is determined that the first tentative mounting positions determined for the respective identification information are different from one another.

It is to be noted that, in the first embodiment, as an example, a case in which the fourth wheel position determination processing unit 60 performs processing while receiving at least ten times (10 Blocks) TPMS data including a sensor ID registered, in association with a position of the wheel W, in the determined position registration unit 80 will be described. In other words, in the first embodiment, as an example, a case in which the fourth wheel position determination processing unit 60 performs processing while receiving ten times or more (10 Blocks) TPMS data including the sensor IDs used in any of the first to fourth wheel position determination processing previously performed will be described.

The determination result detection unit 70 performs processing of detecting a result of the first wheel position determination processing with respect to the first wheel position determination processing unit 30. Then, if the detected result of the first wheel position determination processing is "failure," an instruction signal for starting the second wheel position determination processing is output to the second wheel position determination processing unit 40.

Moreover, the determination result detection unit 70 performs processing of detecting a result of the second wheel position determination processing with respect to the second wheel position determination processing unit 40. Then, if the detected result of the second wheel position determination processing is "failure," an instruction signal for starting the third wheel position determination processing is output to the third wheel position determination processing unit 50.

Further, the determination result detection unit 70 performs processing of detecting a result of the third wheel position determination processing with respect to the third wheel position determination processing unit 50. Then, if the detected result of the third wheel position determination processing is "failure," an instruction signal for starting the fourth wheel position determination processing is output to the fourth wheel position determination processing unit 60.

The position of the wheel W on which the TPMS sensor 2 is installed that have transmitted TPMS data, that have been determined in any processing of the first to fourth wheel position determination processing with respect to each of the sensor IDs is registered by the determined position registration unit 80 in association with that sensor ID.

The display information generation unit 90 receives any signal of the first to fourth wheel position signals and TPMS data.

Moreover, the display information generation unit 90 generates an information signal (display signal) for displaying, based on each of the received signals, air pressures of the respective wheels W in the information display unit 16. Then, this generated information signal is outputted to the information display unit 16. Here, the display signal as described above is a signal for displaying air pressures of the respective wheels W in association with positions of the four wheels W in the vehicle width direction and vehicle longitudinal direction that have been determined through the processing as described above.

Moreover, if there is the wheel W having an air pressure lower than a predetermined placard pressure, the display information generation unit 90 generates a display signal such that the information display unit 16 displays an alarm. It is to be noted that, in addition to display in the information display unit 16, for example, the display signal may be generated such that an alarm is outputted from a speaker for a navigation system through audio guidance and the like. Here, the "air pressure lower than a predetermined placard pressure" is, for example, an air pressure less than or equal to 25% of the placard pressure.

The information display unit 16 is provided as, for example, a display placed on an instrument panel (information display) or a display for a car navigation system, and is connected to the calculation processing unit 14.

Moreover, with respect to the four wheels W whose positions in the vehicle width direction and vehicle longitudinal direction are specified, the information display unit 16 displays the corresponding air pressures in association with positions of the wheels W that have been determined in the processing as described above.

(Operations)

Next, operations performed using the tire air pressure monitoring device 1 according to the first embodiment will be described with reference to FIGS. 1 to 12 using FIGS. 13 to 17.

Figure 13:
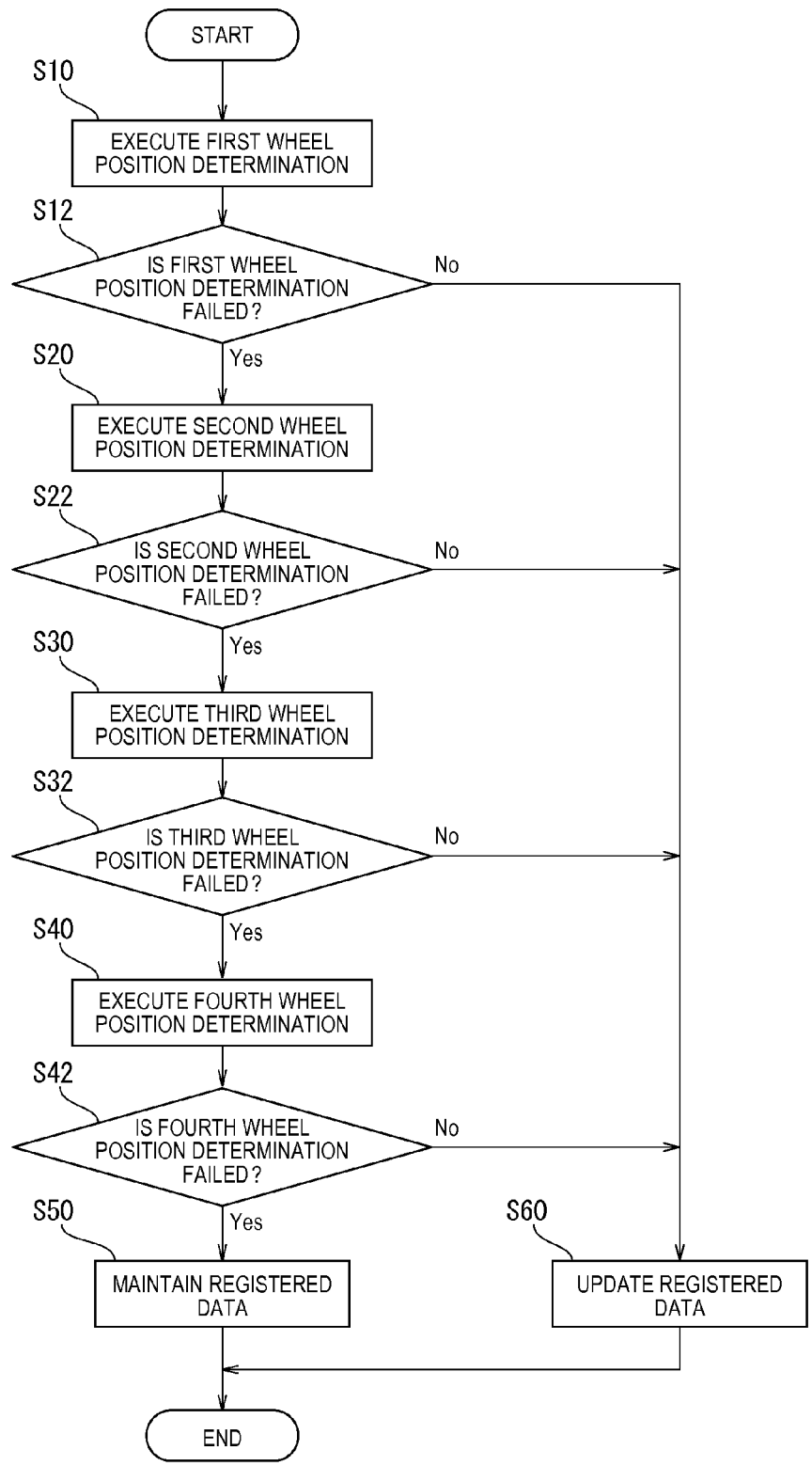
FIG. 13 is a flowchart illustrative of operations performed using the tire air pressure monitoring device.

As illustrated in FIG. 13, if the operations performed using the tire air pressure monitoring device 1 are started (START), first, processing of step S10 is performed.

In step S10, the first wheel position determination processing unit 30 performs the first wheel position determination processing ("EXECUTE FIRST WHEEL POSITION DETERMINATION" indicated in the drawing). In step S10, if the first wheel position determination processing is performed, the operations performed using the tire air pressure monitoring device 1 proceed to step S12. It is to be noted that specific operations in step S10 will be described later.

In step S12, the determination result detection unit 70 performs processing of determining whether or not a result of the first wheel position determination processing performed in step S10 is "failure" ("IS FIRST WHEEL POSITION DETERMINATION FAILED" indicated in the drawing).

In step S12, if the result of the first wheel position determination processing is determined as "failure" ("YES" indicated in the drawing), the operations performed using the tire air pressure monitoring device 1 proceed to step S20.

On the other hand, in step S12, if the result of the first wheel position determination processing is determined as "success" ("NO" indicated in the drawing), the operations performed using the tire air pressure monitoring device 1 proceed to step S60.

In step S20, the second wheel position determination processing unit 40 performs the second wheel position determination processing ("EXECUTE SECOND WHEEL POSITION DETERMINATION" indicated in the drawing). In step S20, if the second wheel position determination processing is performed, the operations performed using the tire air pressure monitoring device 1 proceed to step S22. It is to be noted that specific operations in step S20 will be described later.

In step S22, the determination result detection unit 70 performs processing of determining whether or not a result of the second wheel position determination processing performed in step S20 is "failure" ("IS SECOND WHEEL POSITION DETERMINATION FAILED" indicated in the drawing).

In step S22, if the result of the second wheel position determination processing is determined as "failure" ("YES" indicated in the drawing), the operations performed using the tire air pressure monitoring device 1 proceed to step S30.

On the other hand, in step S22, if the result of the second wheel position determination processing is determined as "success" ("NO" indicated in the drawing), the operations performed using the tire air pressure monitoring device 1 proceed to step S60.

In step S30, the third wheel position determination processing unit 50 performs the third wheel position determination processing ("EXECUTE THIRD WHEEL POSITION DETERMINATION" indicated in the drawing). In step S30, if the third wheel position determination processing is performed, the operations performed using the tire air pressure monitoring device 1 proceed to step S32. It is to be noted that specific operations in step S30 will be described later.

In step S32, the determination result detection unit 70 performs processing of determining whether or not a result of the third wheel position determination processing performed in step S30 is "failure" ("IS THIRD WHEEL POSITION DETERMINATION FAILED" indicated in the drawing).

In step S32, if the result of the third wheel position determination processing is determined as "failure" ("YES" indicated in the drawing), the operations performed using the tire air pressure monitoring device 1 proceed to step S40.

On the other hand, in step S32, if the result of the third wheel position determination processing is determined as "success" ("NO" indicated in the drawing), the operations performed using the tire air pressure monitoring device 1 proceed to step S60.

In step S40, the fourth wheel position determination processing unit 60 performs the fourth wheel position determination processing ("EXECUTE FOURTH WHEEL POSITION DETERMINATION" indicated in the drawing). In step S40, if the fourth wheel position determination processing is performed, the operations performed using the tire air pressure monitoring device 1 proceed to step S42. It is to be noted that specific operations in step S40 will be described later.

In step S42, the determination result detection unit 70 performs processing of determining whether or not a result of the fourth wheel position determination processing performed in step S40 is "failure" ("IS FOURTH WHEEL POSITION DETERMINATION FAILED" indicated in the drawing).

In step S42, if the result of the fourth wheel position determination processing is determined as "failure" ("YES" indicated in the drawing), the operations performed using the tire air pressure monitoring device 1 proceed to step S50.

On the other hand, in step S42, if the result of the fourth wheel position determination processing is determined as "success" ("NO" indicated in the drawing), the operations performed using the tire air pressure monitoring device 1 proceed to step S60.

In step S50, processing of maintaining position data of the wheels W without updating the same that is already registered, in association with the corresponding sensor IDs, in the determined position registration unit 80 and on which the TPMS sensors 2 are installed is performed ("MAINTAIN REGISTERED DATA" indicated in the drawing). In step S50, if the processing of maintaining data already registered in the determined position registration unit 80 without updating the same is performed, the operations performed using the tire air pressure monitoring device 1 are ended (END).

In step S60, processing of updating data registered in the determined position registration unit 80 on data that has been determined in any of the first to fourth wheel position determination processing is performed ("UPDATE REGISTERED DATA" indicated in the drawing). In step S60, if the processing of updating data already registered in the determined position registration unit 80 is performed, the operations performed using the tire air pressure monitoring device 1 are ended (END).

(Specific Operations in Step S10)

Figure 14:
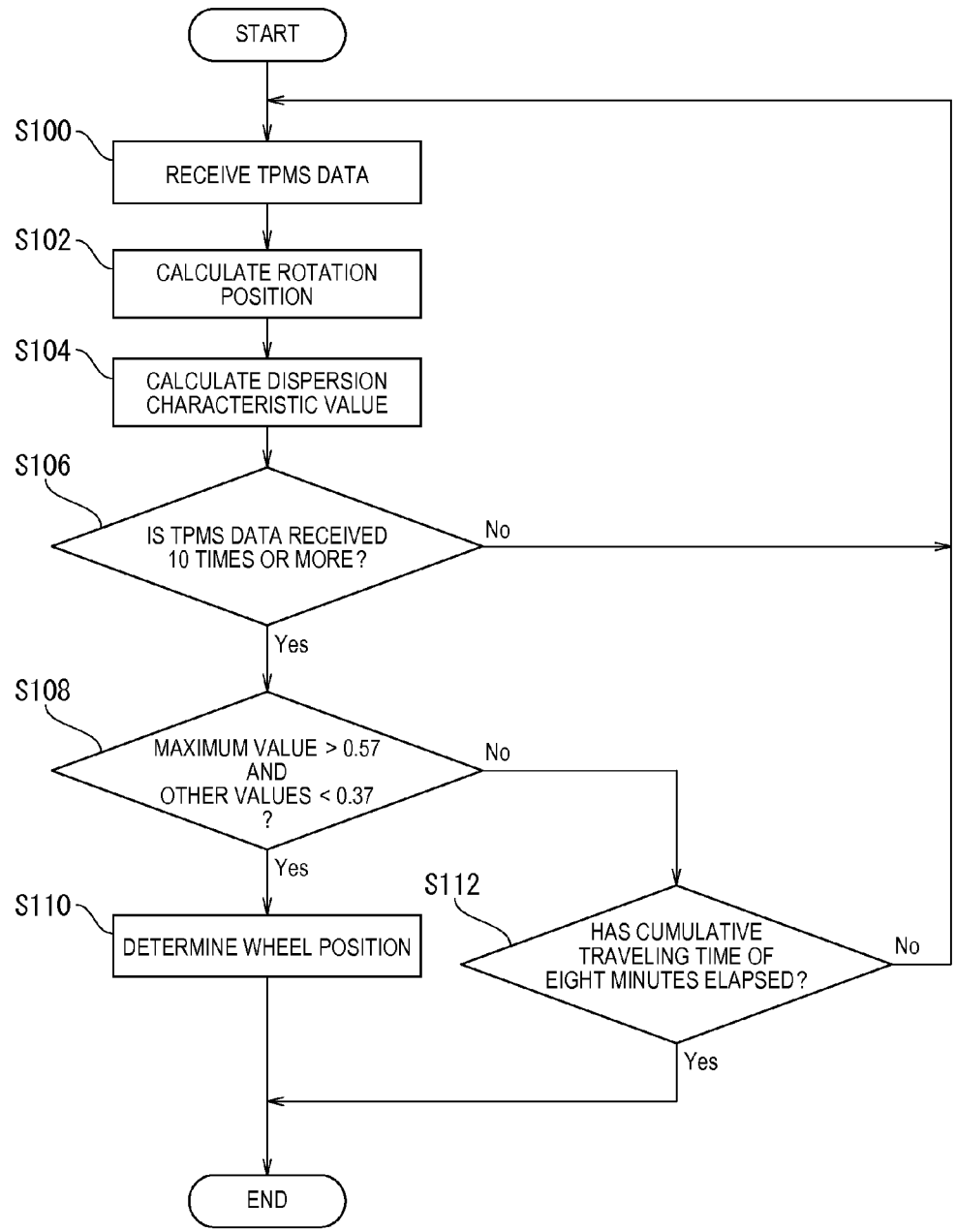
FIG. 14 is a flowchart illustrative of a first wheel position determination processing.

As illustrated in FIG. 14, if the processing of step S10, that is, the first wheel position determination processing is started (START), first, processing of step S100 is performed.

In step S100, the first rotation position calculation unit 30a receives TPMS data including each of the sensor IDs ("RECEIVE TPMS DATA" indicated in the drawing). In step S100, if TPMS data including each of the sensor IDs are received, the first wheel position determination processing proceeds to step S102.

In step S102, the first rotation position calculation unit 30a calculates rotation positions of the respective wheels W ("CALCULATE ROTATION POSITION" indicated in the drawing). In step S102, rotation positions of the respective wheels W are calculated, the first wheel position determination processing proceeds to step S104.

In step S104, the first dispersion characteristic value calculation unit 30b calculates dispersion characteristic values X with respect to each of the sensor IDs ("CALCULATE DISPERSION CHARACTERISTIC VALUE" indicated in the drawing). In step S104, if dispersion characteristic values X are calculated with respect to each of the sensor IDs, the first wheel position determination processing proceeds to step S106.

In step S106, the first wheel position determination unit 30c performs processing of determining whether or not the TPMS data including each of the sensor IDs are each received the number of times more than or equal to a threshold value of the number of data reception. It is to be noted that, in the first embodiment, as an example, a case in which the threshold value of the number of data reception is set at "10 times" will be described ("IS TPMS DATA RECEIVED 10 TIMES OR MORE" indicated in the drawing).

In step S106, if it is determined that the TPMS data including each of the sensor IDs are received 10 times or more ("YES" indicated in the drawing), the first wheel position determination processing proceeds to step S108.

On the other hand, in step S106, if it is determined that the TPMS data including each of the sensor IDs are not received 10 times or more ("NO" indicated in the drawing), the first wheel position determination processing proceeds to step S100.

In step S108, the first wheel position determination unit 30c performs processing of determining whether or not a maximum dispersion characteristic value X is more than "0.57" (first dispersion characteristic threshold value) and dispersion characteristic values X other than the maximum value are less than "0.37" (second dispersion characteristic threshold value). In other words, in step S108, it is determined whether or not a maximum dispersion characteristic value X is more than "0.57" and dispersion characteristic values X other than the maximum value are less than "0.37" ("MAXIMUM VALUE>0.57 AND OTHER VALUES<0.37" indicated in the drawing).

In step S108, if it is determined that each of the dispersion characteristic values X falls within the above ranges ("YES" indicated in the drawing), the first wheel position determination processing proceeds to step S110.

On the other hand, in step S108, if it is determined that at least one of each of the dispersion characteristic values X deviates from the above ranges ("NO" indicated in the drawing), the first wheel position determination processing proceeds to step S112.

In step S110, the first wheel position determination unit 30c determines a wheel position where the maximum dispersion characteristic value is detected as the position of the wheel W on which the TPMS sensor 2 is installed that corresponds to the sensor ID included in rotation position data used for calculating the maximum dispersion characteristic value X ("DETERMINE WHEEL POSITION" indicated in the drawing). In step S110, if the wheel position where the maximum dispersion characteristic value is determined as the position of the wheel W on which the TPMS sensor 2 are installed, the first wheel position determination processing is ended (END).

In step S112, the first wheel position determination unit 30c performs processing of determining whether or not a predetermined cumulative traveling time has elapsed after the start of the first wheel position determination processing. It is to be noted that, in the first embodiment, as an example, a case in which the cumulative traveling time is set at "eight minutes" will be described ("HAS CUMULATIVE TRAVELING TIME OF EIGHT MINUTES ELAPSED" indicated in the drawing).

In step S112, if it is determined that eight minutes have elapsed after the start of the first wheel position determination processing ("YES" indicated in the drawing), the first wheel position determination processing is ended (END).

On the other hand, in step S112, if it is determined that eight minutes have not elapsed after the start of the first wheel position determination processing ("NO" indicated in the drawing), the first wheel position determination processing proceeds to step S100.

(Specific Operations in Step S20)

Figure 15:
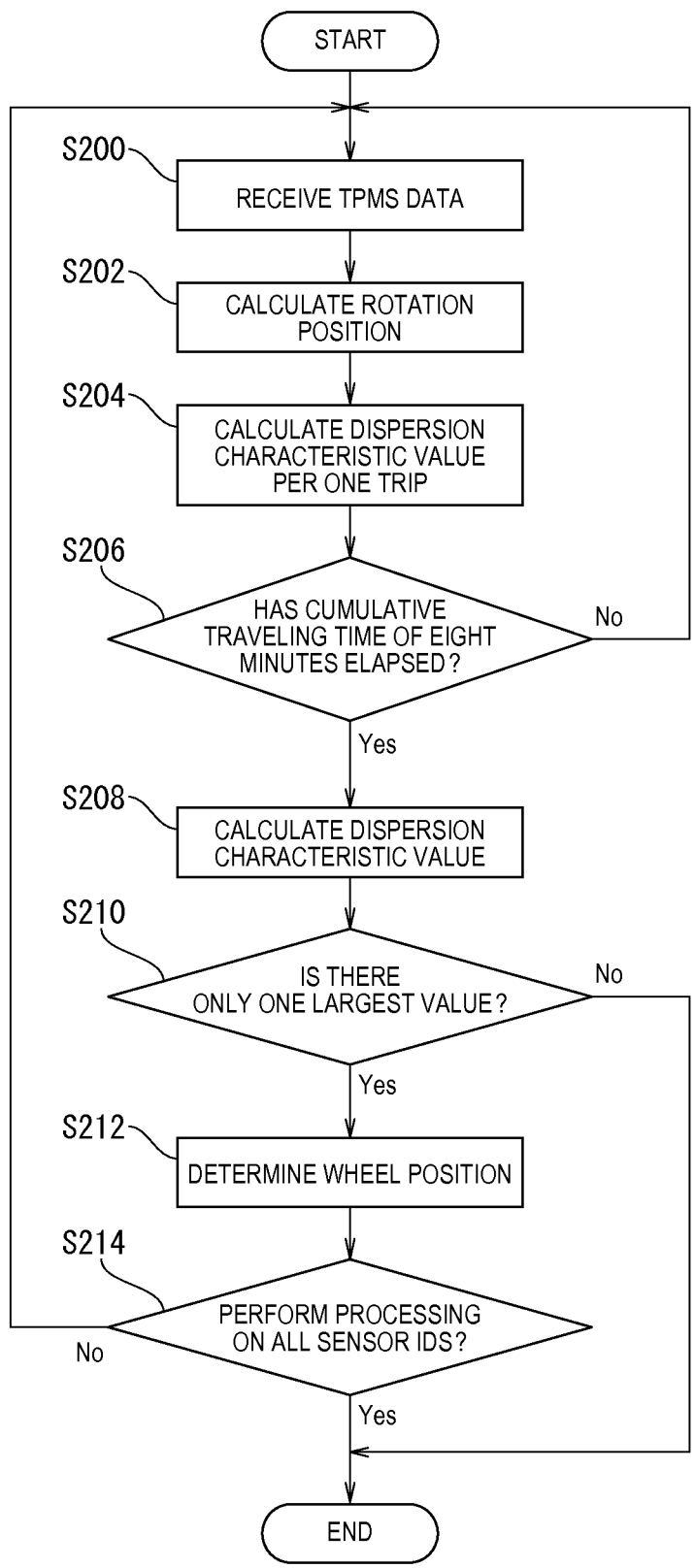
FIG. 15 is a flowchart illustrative of a second wheel position determination processing.

As illustrated in FIG. 15, if the processing of step S20, that is, the second wheel position determination processing is started (START), first, processing of step S200 is performed.

In step S200, the second rotation position calculation unit 40a receives TPMS data including each of the sensor IDs ("RECEIVE TPMS DATA" indicated in the drawing). In step S200, if TPMS data including each of the sensor IDs are received, the second wheel position determination processing proceeds to step S202.

In step S202, the second rotation position calculation unit 40a calculates rotation positions of the respective wheels W ("CALCULATE ROTATION POSITION" indicated in the drawing). In step S202, if rotation positions of the respective wheels W are calculated, the second wheel position determination processing proceeds to step S204.

In step S204, the second dispersion characteristic value calculation unit 40b calculates dispersion characteristic values Xtrpm per "one trip" with respect to each of the sensor IDs ("CALCULATE DISPERSION CHARACTERISTIC VALUE PER ONE TRIP" indicated in the drawing). In step S204, if dispersion characteristic values Xtrpm per "one trip" are calculated with respect to each of the sensor IDs, the second wheel position determination processing proceeds to step S206.

In step S206, the second wheel position determination unit 40c performs processing of determining whether or not a predetermined cumulative traveling time elapses after the start of the second wheel position determination processing. It is to be noted that, in the second embodiment, as an example, a case in which the cumulative traveling time is set at "eight minutes" will be described ("HAS CUMULATIVE TRAVELING TIME OF EIGHT MINUTES ELAPSED" indicated in the drawing).

In step S206, if it is determined that eight minutes have elapsed after the start of the second wheel position determination processing ("YES" indicated in the drawing), the second wheel position determination processing proceeds to step S208.

On the other hand, in step S206, if it is determined that eight minutes have not elapsed after the start of the second wheel position determination processing ("NO" indicated in the drawing), the second wheel position determination processing proceeds to step S200.

In step S208, the second dispersion characteristic value calculation unit 40b calculates final dispersion characteristic values X with respect to each of the sensor IDs ("CALCULATE DISPERSION CHARACTERISTIC VALUE" indicated in the drawing). In step S208, if the final dispersion characteristic values X are calculated with respect to each of the sensor IDs, the second wheel position determination processing proceeds to step S210.

In step S210, the second wheel position determination unit 40c determines whether or not there is only one largest value from among the calculated dispersion characteristic values X ("IS THERE ONLY ONE LARGEST VALUE" indicated in the drawing).

In step S210, if it is determined that there is only one largest value from among the calculated dispersion characteristic values X ("YES" indicated in the drawing), the second wheel position determination processing proceeds to step S212.

On the other hand, in step S210, if it is determined that there are two or more largest values from among the calculated dispersion characteristic values X ("NO" indicated in the drawing), the second wheel position determination processing is ended (END).

In step S212, the second wheel position determination unit 40c determines a wheel position where the maximum dispersion characteristic value is detected as a position of the wheel W on which the TPMS sensor 2 is installed that corresponds to the sensor ID included in rotation position data used for calculating the maximum dispersion characteristic value Xtrpm ("DETERMINE WHEEL POSITION" indicated in the drawing). In step S212, if the wheel position where the maximum dispersion characteristic value is detected is determined as the position of the wheel W on which the TPMS sensor 2 is installed, the second wheel position determination processing proceeds to step S214.

In step S214, it is determined whether or not the second wheel position determination processing has been performed with respect to all the sensor IDs ("PERFORM PROCESSING ON ALL SENSOR IDS" indicated in the drawing).

In step S214, if it is determined that the second wheel position determination processing has been performed with respect to all the sensor IDs ("YES" indicated in the drawing), the second wheel position determination processing is ended (END).

On the other hand, in step S214, if it is determined that the second wheel position determination processing has not been performed with respect to at least one of the sensor IDs ("NO" indicated in the drawing), the second wheel position determination processing proceeds to step S200.

(Specific Operations in Step S30)

Figure 16:
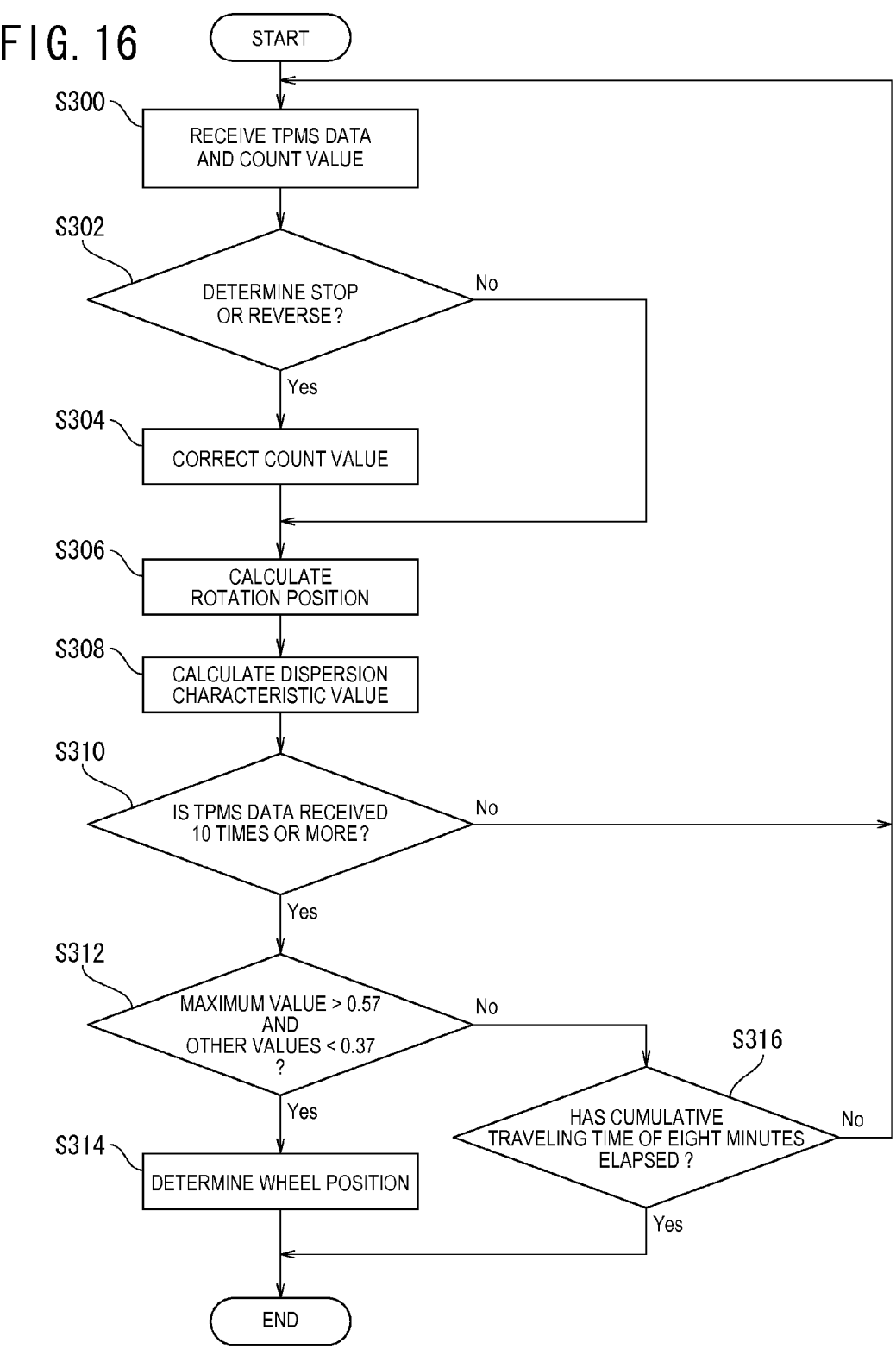
FIG. 16 is a flowchart illustrative of a third wheel position determination processing.

As illustrated in FIG. 16, if the processing of step S30, that is, the third wheel position determination processing is started (START), first, processing of step S300 is performed.

In step S300, the third rotation position calculation unit 50c receives TPMS data including each of the sensor IDs. In addition, in step S300, the stop/reverse determination unit 50a receives all the count values of wheel speed pulses ("RECEIVE TPMS DATA AND COUNT VALUE" indicated in the drawing). In step S300, if TPMS data including each of the sensor IDs and all the count values of wheel speed pulses are received, the third wheel position determination processing proceeds to step S302.

In step S302, the stop/reverse determination unit 50a performs processing of determining whether or not the vehicle C is either stopping or reversing ("DETERMINE STOP OR REVERSE" indicated in the drawing).

In step S302, if it is determined that the vehicle C is either stopping or reversing ("YES" indicated in the drawing), the third wheel position determination processing proceeds to step S304.

On the other hand, in step S302, if it is determined that the vehicle C is neither stopping nor reversing ("NO" indicated in the drawing), the third wheel position determination processing proceeds to step S306.

In step S304, the count value correction unit 50b calculates a stop-case corrected count value or a reverse-case corrected count value ("CORRECT COUNT VALUE" indicated in the drawing). In step S304, if a stop-case corrected count value or a reverse-case corrected count value is calculated, the third wheel position determination processing proceeds to step S306.

In step S306, the third rotation position calculation unit 50c calculates rotation positions of the respective wheels W using the corrected count value calculated in step S304 ("CALCULATE ROTATION POSITION" indicated in the drawing). In step S306, if rotation positions of the respective wheels W are calculated, the third wheel position determination processing proceeds to step S308.

In step S308, the third dispersion characteristic value calculation unit 50d calculates dispersion characteristic values X with respect to each of the sensor IDs ("CALCULATE DISPERSION CHARACTERISTIC VALUE" indicated in the drawing). In step S308, if dispersion characteristic values X are calculated with respect to each of the sensor IDs, the third wheel position determination processing proceeds to step S310.

In step S310, the third wheel position determination unit 50e performs processing of determining whether or not the TPMS data including each of the sensor IDs are each received the number of times more than or equal to the threshold value ("ten times") of the number of data reception ("IS TPMS DATA RECEIVED 10 TIMES OR MORE" indicated in the drawing).

In step S310, if it is determined that the TPMS data including each of the sensor IDs are received 10 times or more ("YES" indicated in the drawing), the third wheel position determination processing proceeds to step S312.

On the other hand, in step S310, if it is determined that the TPMS data including each of the sensor IDs are not received 10 times or more ("NO" indicated in the drawing), the third wheel position determination processing proceeds to step S300.

In step S312, the third wheel position determination unit 50e performs processing of determining whether or not a maximum dispersion characteristic value X is more than "0.57" (first dispersion characteristic threshold value) and dispersion characteristic values X other than the maximum value are less than "0.37" (second dispersion characteristic threshold value). In other words, in step S312, it is determined whether or not a maximum dispersion characteristic value X is more than "0.57" and dispersion characteristic values X other than the maximum value are less than "0.37" ("MAXIMUM VALUE>0.57 AND OTHER VALUES<0.37" indicated in the drawing).

In step S312, if it is determined that each of the dispersion characteristic values X falls within the above ranges ("YES" indicated in the drawing), the third wheel position determination processing proceeds to step S314.

On the other hand, in step S312, if it is determined that at least one of each of the dispersion characteristic values X deviates from the above ranges ("NO" indicated in the drawing), the third wheel position determination processing proceeds to step S316.

In step S314, the third wheel position determination unit 50e determines a wheel position where the maximum dispersion characteristic value is detected as a position of the wheel W on which the TPMS sensor 2 is installed that corresponds to the sensor ID included in rotation position data used for calculating the maximum dispersion characteristic value X ("DETERMINE WHEEL POSITION" indicated in the drawing). In step S314, if the wheel position where the maximum dispersion characteristic value is detected is determined as the position of the wheel W on which the TPMS sensor 2 is installed, the third wheel position determination processing is ended (END).

In step S316, the third wheel position determination unit 50e performs processing of determining whether or not a predetermined cumulative traveling time ("eight minutes") has elapsed after the start of the first wheel position determination processing ("HAS CUMULATIVE TRAVELING TIME OF EIGHT MINUTES ELAPSED" indicated in the drawing).

In step S316, if it is determined that eight minutes have elapsed after the start of the third wheel position determination processing ("YES" indicated in the drawing), the third wheel position determination processing is ended (END).

On the other hand, in step S316, if it is determined that eight minutes have not elapsed after the start of the first wheel position determination processing ("NO" indicated in the drawing), the third wheel position determination processing proceeds to step S300.

(Specific Operations in Step S40)

Figure 17:
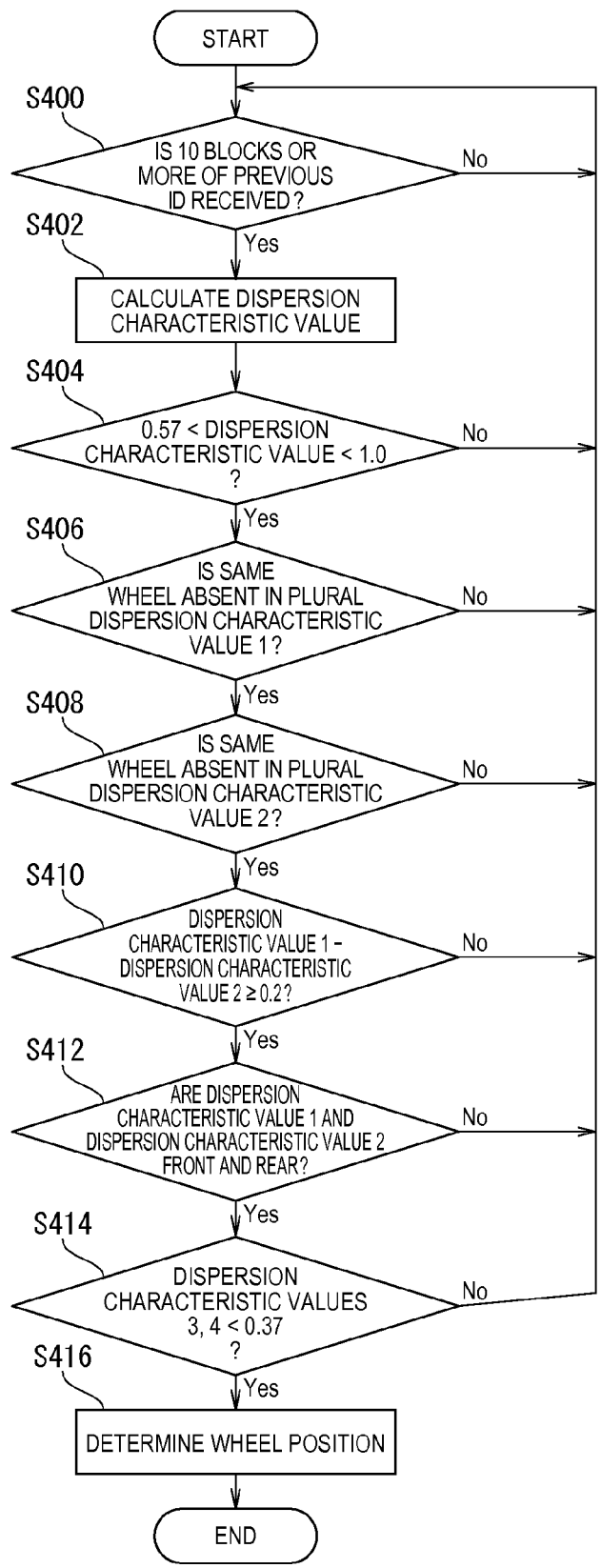
FIG. 17 is a flowchart illustrative of a fourth wheel position determination processing.

As illustrated in FIG. 17, if the processing of step S40, that is, the fourth wheel position determination processing is started (START), first, processing of step S400 is performed.

In step S400, processing of determining whether or not 10 Blocks or more of the TPMS data including the sensor IDs that have been used in the wheel position determination processing previously performed are received is performed ("IS 10 BLOCKS OR MORE OF PREVIOUS ID RECEIVED" indicated in the drawing).

In step S400, if it is determined that 10 Blocks or more of the TPMS data including the sensor IDs that have been used in the wheel position determination processing previously performed are received ("YES" indicated in the drawing), the fourth wheel position determination processing proceeds to step S402.

On the other hand, in step S400, if it is determined that 10 Blocks or more of the TPMS data including the sensor IDs that have been used in the wheel position determination processing previously performed are not received ("NO" indicated in the drawing), the fourth wheel position determination processing proceeds to step S400.

In step S402, the fourth dispersion characteristic value calculation unit 60b calculates dispersion characteristic values X with respect to each of the sensor IDs ("CALCULATE DISPERSION CHARACTERISTIC VALUE" indicated in the drawing). In step S402, if dispersion characteristic values X are calculated with respect to each of the sensor IDs, the fourth wheel position determination processing proceeds to step S404.

In step S404, the fourth wheel position determination unit 60c performs processing of determining whether or not the maximum dispersion characteristic value of each of the sensor IDs is more than 0.57 (upper dispersion characteristic threshold value) and less than 1.0 ("0.57<DISPERSION CHARACTERISTIC VALUE<1.0" indicated in the drawing).

In step S404, if it is determined that maximum dispersion characteristic value of each of the sensor IDs is more than 0.57 and less than 1.0 ("YES" indicated in the drawing), the fourth wheel position determination processing proceeds to step S406.

On the other hand, in step S404, if it is determined that a condition in which maximum dispersion characteristic value of the sensor ID is less than or equal to 0.57 or a condition in which maximum dispersion characteristic value of the sensor ID is more than 1.0 is satisfied ("NO" indicated in the drawing), the fourth wheel position determination processing proceeds to step S400.

In step S406, the fourth wheel position determination unit 60c determines whether or not there are the maximum dispersion characteristic values of the plural sensor IDs calculated for the same wheel W ("IS SAME WHEEL ABSENT IN PLURAL DISPERSION CHARACTERISTIC VALUES 1" indicated in the drawing).

In step S406, if it is determined that there are not the maximum dispersion characteristic values of the plural sensor IDs calculated for the same wheel W ("YES" indicated in the drawing), the fourth wheel position determination processing proceeds to step S408.

On the other hand, in step S406, if it is determined that there are the maximum dispersion characteristic values of the plural sensor IDs calculated for the same wheel W ("NO" indicated in the drawing), the fourth wheel position determination processing proceeds to step S400.

In step S408, the fourth wheel position determination unit 60c determines whether or not there are the second largest dispersion characteristic values of the plural sensor IDs calculated for the same wheel W ("IS SAME WHEEL ABSENT IN PLURAL DISPERSION CHARACTERISTIC VALUES 2" indicated in the drawing).

In step S408, if it is determined that there are not the second largest dispersion characteristic values of the plural sensor IDs calculated for the same wheel W ("YES" indicated in the drawing), the fourth wheel position determination processing proceeds to step S410.

On the other hand, in step S408, if it is determined that there are the second largest dispersion characteristic values of the plural sensor IDs calculated for the same wheel W ("NO" indicated in the drawing), the fourth wheel position determination processing proceeds to step S400.

In step S410, the fourth wheel position determination unit 60c determines whether or not a value obtained by subtracting the second largest maximum dispersion characteristic value of each of the sensor ID from the maximum dispersion characteristic value of each of the sensor IDs is more than or equal to 0.2 ("DISPERSION CHARACTERISTIC VALUE 1–DISPERSION CHARACTERISTIC VALUE 2>0.2" indicated in the drawing). In other words, in step S410, whether or not the value obtained by subtracting the second largest maximum dispersion characteristic value of each of the sensor IDs is subtracted from the maximum dispersion characteristic value of each of the sensor IDs is more than or equal to a dispersion characteristic threshold value for difference determination.

In step S410, if it is determined that the value obtained by subtracting the second largest maximum dispersion characteristic value of each of the sensor IDs from the maximum dispersion characteristic value of each of the sensor IDs is more than or equal to 0.2 ("YES" indicated in the drawing), the fourth wheel position determination processing proceeds to step S412.

On the other hand, in step S410, if it is determined that the value obtained by subtracting the second maximum dispersion characteristic value of the sensor ID from the maximum dispersion characteristic value of the same sensor ID is less than 0.2 ("NO" indicated in the drawing), the fourth wheel position determination processing proceeds to step S400.

In step S412, the fourth wheel position determination unit 60c determines whether or not the dispersion characteristic value 1 and the dispersion characteristic value 2 of each of the sensor IDs are on the same side in the vehicle width direction and on the different side in the vehicle longitudinal direction ("ARE DISPERSION CHARACTERISTIC VALUE 1 AND DISPERSION CHARACTERISTIC VALUE 2 FRONT AND REAR" indicated in the drawing).

In step S412, if it is determined that the dispersion characteristic value 1 and the dispersion characteristic value 2 of each of the sensor IDs are on the same side in the vehicle width direction and on the different side in the vehicle longitudinal direction ("YES" indicated in the drawing), the fourth wheel position determination processing proceeds to step S414.

On the other hand, in step S410, if it is determined that the dispersion characteristic value 1 and the dispersion characteristic value 2 of the sensor ID is on the same side in the vehicle width direction and on the same side in the vehicle longitudinal direction ("NO" indicated in the drawing), the fourth wheel position determination processing proceeds to step S400.

In step S414, the fourth wheel position determination unit 60c determines whether or not the dispersion characteristic value 3 and the dispersion characteristic value 4 of each of the sensor IDs is less than 0.37 (lower dispersion characteristic threshold value) ("DISPERSION CHARACTERISTIC VALUES 3, 4<0.37" indicated in the drawing).

In step S414, if it is determined that the dispersion characteristic value 3 and the dispersion characteristic value 4 of each of the sensor IDs are less than 0.37 ("YES" indicated in the drawing), the fourth wheel position determination processing proceeds to step S416.

On the other hand, in step S414, if it is determined that the dispersion characteristic value 3 or the dispersion characteristic value 4 of the sensor ID is more than or equal to 0.37 ("NO" indicated in the drawing), the fourth wheel position determination processing proceeds to step S400.

In step S416, the fourth wheel position determination unit 60c decides positions of the respective wheels W that have been estimated as target wheel 1 with respect to each of the sensor IDs ("DETERMINE WHEEL POSITION" indicated in the drawing). In step S416, if positions of the respective wheels W that have been estimated as target wheel 1 with respect to each of the sensor IDs are decided, the fourth wheel position determination processing is ended (END).

It is to be noted that the air pressure sensor 18 as described above corresponds to the tire air pressure detection unit.

Moreover, the transmitter 24 as described above corresponds to a data transmission unit.

Moreover, the information reception unit 4 as described above corresponds to a data reception unit.

Moreover, the wheel speed detection unit 6 as described above corresponds to the rotation position detection unit.

Moreover, in a tire air pressure monitoring method performed through the operations of the tire air pressure monitoring device 1 according to the first embodiment, a tire air pressure together with identification information are transmitted when a rotation position of the wheel W comes into agreement with a rotation position for calculation, and the detected air pressure and the identification information are received at the vehicle body. Further, processing in which each time at least the identification information out of the air pressure and the identification information that have been transmitted is received, the detected rotation position of each of the wheels W is obtained and accumulated as rotation position data of each of the wheels W is performed with respect to each piece of the identification information. Then, the first tentative mounting position is determined as a mounting position of the wheel W to which each piece of the identification information corresponds.

This determination is made if it is determined that, with respect to all the identification information, the first tentative mounting position and the second tentative mounting position are positions that are the same in the vehicle width direction and different from each other in the vehicle longitudinal direction, and that the first tentative mounting position determined for each piece of identification information is different from one another.

It is to be noted that the first embodiment as described above is illustrative of the present invention, and the present invention is not limited to the above first embodiment, and, even in an embodiment other than this embodiment, various changes could be made hereto according to design or the like without departing from the technical concept of the present invention.

Effect of the First Embodiment

The tire air pressure monitoring device 1 according to the first embodiment can produce effects as described below.

(1) If the conditions (I) and (II) as described above is satisfied with respect to all the identification information, the fourth wheel position determination unit 60c determines the first tentative mounting position as a mounting position of the wheel W to which the identification information corresponds.

Thus, it is possible, by using the regularity of the relationship between rotation position data having the smallest degree of dispersion and rotation position data having the second smallest degree of dispersion, to determine a mounting position of the wheel W at which the rotation position data having the smallest degree of dispersion is detected.

Consequently, even if a difference in rotation speed between the front wheels WF and the rear wheels WR is small when the vehicle C is traveling in the direct-connection four-wheel drive mode, for example, improving accuracy in specifying positions of the respective wheels W included in the vehicle C is enabled.

Moreover, even if association between the sensor IDs and positions of the wheels W that have been registered in the determined position registration unit 80 changes when tire rotation is performed, for example, it is possible to update data registered in the determined position registration unit 80 without requiring manual processing is enabled.

Here, the "tire rotation" is an operation of replacing mounting positions of a tire with each other to make a tread wear of the tire uniform, thereby extending the lifetime (tread life). For example, in a passenger car, generally, the front wheels and the rear wheels are replaced with each other with the left and right positions crossed.

Moreover, even if the association between the sensor IDs and positions of the wheels W that have been registered in the determined position registration unit 80 changes when tire rotation is performed, for example, it is possible to display the correspondence between detected tire air pressure and positions of the wheels W in a state after the change.

(2) The fourth dispersion characteristic value calculation unit 60b converts rotation positions of the respective wheels W to vectors starting at the origin and ending at a point on the circumference of a unit circle on the two-dimensional plane, and calculates a scalar quantity of average vector of vectors in the respective rotation position data as a dispersion characteristic value. In addition, the fourth wheel position determination unit 60c determines the largest value from among each of the dispersion characteristic values as rotation position data having the smallest degree of dispersion.

Consequently, it is possible to avoid periodicity of rotation position data and calculate degrees of dispersion of rotation positions.

The fourth wheel position determination unit 60c does not perform processing of determining, with respect to all the identification information, a tentative mounting position of the target wheel 1 as a mounting position of the wheel to which identification information corresponds if a difference between the dispersion characteristic value 1 and the dispersion characteristic value 2 is less than a dispersion characteristic threshold value for difference determination.

Thus, it is possible to determine whether or not the first tentative mounting position and the second tentative mounting position are positions that are the same in the vehicle width direction and different from each other in the vehicle longitudinal direction while a difference between magnitude of the dispersion characteristic value 1 and magnitude of the dispersion characteristic value 2 is clear.

Consequently, it is possible to improve accuracy in specifying positions of the respective wheels W included in the vehicle C.

(4) The fourth wheel position determination unit 60c does not perform processing of determining, with respect to all the identification information, a tentative mounting position of the target wheel 1 as a mounting position of the wheel to which identification information corresponds if the dispersion characteristic value 3 and the dispersion characteristic value 4 are more than or equal to a lower dispersion characteristic threshold value.

Thus, it is possible to determine whether or not the first tentative mounting position and the second tentative mounting position are positions that are the same in the vehicle width direction while a difference in magnitude between the dispersion characteristic value 1 and the dispersion characteristic value 2 and a difference in magnitude between the dispersion characteristic value 3 and the dispersion characteristic value 4 are clear. In addition, it is possible to determine whether or not the first tentative mounting position and the second tentative mounting position are positions that are different from each other in the vehicle longitudinal direction while a difference in magnitude between the dispersion characteristic value 1 and the dispersion characteristic value 2 and a difference in magnitude between the dispersion characteristic value 3 and the dispersion characteristic value 4 are clear.

Consequently, it is possible to improve accuracy in specifying positions of the respective wheels W included in the vehicle C.

(5) The vehicle C is configured to include, as a drive mode, a direct-connection four-wheel drive mode in which the front wheels WF and the rear wheels WR are drive wheels and rotation speeds of the front wheels WF and rotation speeds of the rear wheels WR are constantly equal.

Consequently, particularly in winter when there often arise situations in which the vehicle C runs in the direct-connection four-wheel drive mode and in cold areas, it is possible to improve accuracy in specifying positions of the respective wheels W included in the vehicle C. Further, employing such a configuration in trucks (cargo carrying vehicle) or the like that are a type of vehicles which often run in the direct-connection four-wheel drive mode allows accuracy in specifying positions of the respective wheels W included in the vehicle C to be improved.

(6) In the tire air pressure monitoring method performed through the operations of the tire air pressure monitoring device 1 according to the first embodiment, a tire air pressure together with identification information are transmitted when a rotation position of the wheel W comes into agreement with a rotation position for calculation, and the detected air pressure and the identification information are received by the vehicle body. Then, if the conditions (I) and (II) as described above are satisfied with respect to all the identification information, the first tentative mounting position is determined as a mounting position of the wheel W to which each piece of the identification information corresponds.

Thus, it is possible, by using the regularity of the relationship between rotation position data having the smallest degree of dispersion and rotation position data having the second smallest degree of dispersion, to determine a mounting position of the wheel W at which the rotation position data having the smallest degree of dispersion is detected.

Consequently, even if a difference in rotation speed between the front wheels WF and the rear wheels WR is small when the vehicle C is traveling in the direct-connection four-wheel drive mode, for example, improving accuracy in specifying positions of the respective wheels W included in the vehicle C is enabled.

Moreover, even if association between the sensor IDs and positions of the wheels W that have been registered in the determined position registration unit 80 changes when tire rotation is performed, for example, it is update data registered in the determined position registration unit 80 without requiring manual processing. In addition, it is possible to display the association between detected tire air pressure and positions of the wheels W in a state after the change.

(Modifications)

(1) In the first embodiment, the fourth wheel position determination unit 60c determines whether or not only the maximum dispersion characteristic value of each of the sensor IDs is above the upper dispersion characteristic threshold value, which is not limitative.

Specifically, the fourth wheel position determination unit 60c may determine whether or not maximum dispersion characteristic values and largest values behind the corresponding maximum dispersion characteristic values of each of the sensor IDs is above the upper dispersion characteristic threshold value. In addition, two rotation position data that are above the upper dispersion characteristic threshold value may be determined as rotation position data having the smallest degree of dispersion (dispersion characteristic value 1) and rotation position data having the second smallest degree of dispersion (dispersion characteristic value 2).

In this case, it is possible to clearly distinguish the two dispersion characteristic values corresponding to the target wheel 1 and the target wheel 2 that are to be determined whether or not positions thereof are the same in the vehicle width direction and different from each other in the vehicle longitudinal direction from the other dispersion characteristic values. Thus, it is possible to improve accuracy in specifying positions of the respective wheels W included in the vehicle C.

(2) In the first embodiment, the vehicle C is configured to include, as a drive mode, a direct-connection four-wheel drive mode, which is not limitative. Specifically, the vehicle C may be configured to include, as a drive mode, a differential four-wheel drive mode in which the front wheels WF and the rear wheels WR are drive wheels and a speed difference between rotation speeds of the front wheels WF and rotation speeds of the rear wheels WR is absorbed.

In this case, particularly, in situations in which rotation speeds of the front wheels and rotation speeds of the rear wheels are equal during straight traveling of the vehicle C or the like, it is possible to improve accuracy in specifying positions of the respective wheels W included in the vehicle C.

(3) In the first embodiment, the determination result detection unit 70 is configured to output to the fourth wheel position determination processing unit 60 an instruction signal for starting the fourth wheel position determination processing if results of the first to third wheel position determination processing are "failures," which is not limitative.

Specifically, if a drive mode contained in a drive mode signal inputted to the determination result detection unit 70 is a 4WD mode, the fourth wheel position determination processing may be started without performing the first to third wheel position determination processing.

What is claimed is:

1. A tire air pressure monitoring device that is included in a vehicle capable of traveling in a four-wheel drive mode in which front wheels and rear wheels are drive wheels, and is configured to monitor an air pressure of each of a plurality of tires mounted on a plurality of wheels, respectively, in association with a mounting position of each of the wheels in a vehicle body, the device comprising:

tire air pressure detection units respectively mounted on the tires and each configured to detect the air pressure of each of the tires on which the tire air pressure detection units are installed, respectively;

data transmission units respectively mounted on the wheels, each of the data transmission units being configured to transmit the detected air pressure together with identification information specific to one of the wheels on which the each of the data transmission units is installed, when a rotation position of the one of wheels comes into agreement with a predetermined rotation position, the identification information not including information on the mounting position of each of the wheels;

a data reception unit placed in the vehicle body and configured to receive the detected air pressure and the identification information;

rotation position detection units each configured to detect the rotation position of each of the wheels; and a wheel position determination unit configured to:
 perform, with respect to each piece of the identification information, processing in which each time the data reception unit receives at least the identification information out of the air pressure and the identification information that have been transmitted from each of the data transmission units, the rotation position of each of the wheels that have been detected by each of the rotation position detection units is obtained to be accumulated as rotation position data of each of the wheels; and
 determine a mounting position of each of the wheels based on degrees of dispersion in the accumulated rotation position data, with configuration to:
  calculate, with respect to each piece of the identification information, the degrees of dispersion of the rotation position data of the wheels respectively;
  determine, with respect to each piece of identification information, a mounting position of one of the wheels at which a smallest degree of dispersion is calculated as a first tentative mounting position;
  determine, with respect to each piece of identification information, a mounting position of another of the wheels at which a second smallest degree of dispersion is calculated as a second tentative mounting position; and
  determine that each of the wheels is mounted at the first tentative mounting position determined for each piece of the identification information, when it is determined that the first tentative mounting position and the second tentative mounting position are the same in a vehicle width direction and different from each other in a vehicle longitudinal direction with respect to each piece of identification information, and when it is determined that the first tentative mounting position determined for each piece of the identification information is different from one another.

2. The tire air pressure monitoring device according to claim 1, further comprising a dispersion characteristic value calculation unit configured to convert the rotation position of each of the wheels to a vector starting at the origin and ending at a point on a circumference of a unit circle on a two-dimensional plane, and to calculate a scalar quantity of an average vector of vectors in each of the respective rotation position data as a dispersion characteristic value,
 wherein the wheel position determination unit is configured to determine a largest value of the dispersion characteristic value as the rotation position data having the smallest degree of dispersion.

3. The tire air pressure monitoring device according to claim 1, wherein the wheel position determination unit is configured to determine, from among the accumulated rotation position data, two rotation position data that exceed a predetermined upper dispersion characteristic threshold value as the rotation position data having the smallest degree of dispersion and the rotation position data having the second smallest degree of dispersion.

4. The tire air pressure monitoring device according to claim 1, wherein the wheel position determination unit is configured not to perform processing of determining the first tentative mounting position as the mounting position of the wheel corresponding to the identification information, when, with respect to at least one piece of the identification information, a difference between the rotation position data having the smallest degree of dispersion and the rotation position data having the second smallest degree of dispersion is less than a predetermined dispersion characteristic threshold value for difference determination.

5. The tire air pressure monitoring device according to claim 1, wherein the wheel position determination unit configured not to perform processing of determining the first tentative mounting position as the mounting position of the wheel corresponding to the identification information, when, with respect to at least one piece of the identification information, rotation position data having a degree of dispersion larger than the second smallest degree of dispersion from among the accumulated rotation position data is more than or equal to a predetermined lower dispersion characteristic threshold value.

6. The tire air pressure monitoring device according to claim 1,
 wherein the four-wheel drive mode includes a direct-connection four-wheel drive mode in which rotation speeds of the front wheels and rotation speeds of the rear wheels are constantly equal.

7. The tire air pressure monitoring device according to claim 1,
 wherein the four-wheel drive mode includes a differential four-wheel drive mode in which a speed difference between rotation speeds of the front wheels and rotation speeds of the rear wheels is absorbed.

8. A tire air pressure monitoring method used in a vehicle capable of traveling in a four-wheel drive mode in which front wheels and rear wheels are drive wheels, for monitoring an air pressure of each of a plurality of tires mounted on a plurality of wheels, respectively, in association with a mounting position of each of the wheels in a vehicle body, the method comprising:

- detecting the air pressure of each of the tires;
- transmitting the detected air pressure together with identification information specific to each of the wheels on which the tires are mounted, respectively, when a rotation position of each of the wheels comes into agreement with a predetermined rotation position, the identification information not including information on the mounting position of each of the wheels;
- receiving the detected air pressure and the identification information at the vehicle body;
- detecting a rotation position of each of the wheels; and
- performing, with respect to each piece of identification information, processing in which each time at least the identification information out of the air pressure and the identification information that have been transmitted is received, the detected rotation position of each of the wheels is obtained and accumulated as rotation position data of each of the wheels;
- calculating, with respect to each piece of identification information, the degrees of dispersion of the rotation position data of the wheels respectively;
- determining, with respect to each piece of identification information, a mounting position of one of the wheels at which a smallest degree of dispersion is calculated as a first tentative mounting position;
- determining, with respect to each piece of identification information, a mounting position of another of the wheels at which a second smallest degree of dispersion is calculated as a second tentative mounting position; and
- determining that each of the wheels is mounted at the first tentative mounting position determined for each piece of the identification information, when it is determined that the first tentative mounting position and the second tentative mounting position are the same in a vehicle width direction and different from each other in a vehicle longitudinal direction with respect to each piece of identification information, and when it is determined that the first tentative mounting position determined for each piece of the identification information is different from one another.

\* \* \* \* \*